United States Patent
Pearson

(10) Patent No.: US 11,100,940 B2
(45) Date of Patent: Aug. 24, 2021

(54) TRAINING A VOICE MORPHING APPARATUS

(71) Applicant: SoundHound, Inc., Santa Clara, CA (US)

(72) Inventor: Steve Pearson, Felton, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 37 days.

(21) Appl. No.: 16/740,378

(22) Filed: Jan. 10, 2020

(65) Prior Publication Data

US 2021/0193159 A1   Jun. 24, 2021

(30) Foreign Application Priority Data

Dec. 20, 2019   (EP) ..................... 19219047

(51) Int. Cl.
*G10L 15/22*   (2006.01)
*G10L 17/04*   (2013.01)
(Continued)

(52) U.S. Cl.
CPC ............ *G10L 21/013* (2013.01); *G10L 17/00* (2013.01); *G10L 21/0364* (2013.01);
(Continued)

(58) Field of Classification Search
CPC ......... G10L 15/22; G10L 17/04; G10L 17/00; G10L 15/26
See application file for complete search history.

(56) References Cited

U.S. PATENT DOCUMENTS 5,567,901 A    10/1996 Gibson
5,893,057 A *   4/1999 Fujimoto ................ G10L 17/00
                                                    704/246

(Continued)

FOREIGN PATENT DOCUMENTS

EP          2215632 B1    3/2011
WO     WO 2019/116889    6/2019

OTHER PUBLICATIONS

Mohamed Abou-Zleikha, A Discriminative Approach for Speaker Selection in Speaker De-Identification Systems, 2015, 23rd European Signal Processing Conference (EUSIPCO), pp. 2102-2106.

(Continued)

*Primary Examiner* — Shreyans A Patel
(74) *Attorney, Agent, or Firm* — Dana Legal Services; Jubin Dana

(57) ABSTRACT

Systems and methods for training a voice morphing apparatus are described. The voice morphing apparatus is trained to morph input audio data to mask an identity of a speaker. Training is performed by evaluating an objective function that is a function of the input audio data and an output of the voice morphing apparatus. The objective function may have a first term that is based on speaker identification and a second term that is based on audio fidelity. By optimizing the objective function, parameters of the voice morphing apparatus may be adjusted so as to reduce a confidence of speaker identification and maintain an audio fidelity of the morphed audio data. The voice morphing apparatus, once trained, may be used as part of an automatic speech recognition system.

24 Claims, 9 Drawing Sheets

(51) Int. Cl.
  *G10L 17/00*  (2013.01)
  *G10L 15/26*  (2006.01)
  *G10L 21/013*  (2013.01)
  *G10L 25/18*  (2013.01)
  *G10L 25/30*  (2013.01)
  *G10L 25/51*  (2013.01)
  *G10L 21/0364*  (2013.01)

(52) U.S. Cl.
  CPC .............. *G10L 25/18* (2013.01); *G10L 25/30* (2013.01); *G10L 25/51* (2013.01); *G10L 2021/0135* (2013.01)

(56) References Cited

U.S. PATENT DOCUMENTS

| | | | | |
|---|---|---|---|---|
| 5,946,658 | A * | 8/1999 | Miyazawa | .............. G10L 15/26 704/275 |
| 8,170,878 | B2 | 5/2012 | Liu | |
| 10,839,809 | B1 * | 11/2020 | Jha | .......................... H04L 65/80 |
| 2008/0195387 | A1 * | 8/2008 | Zigel | ...................... G10L 17/06 704/236 |
| 2009/0030865 | A1 * | 1/2009 | Sawada | .............. G06K 9/00362 706/46 |
| 2014/0195222 | A1 | 7/2014 | Peevers | |
| 2015/0336578 | A1 * | 11/2015 | Lord | ......................... B60T 7/22 701/2 |
| 2018/0342256 | A1 | 11/2018 | Huffman | |

OTHER PUBLICATIONS

Alice Cohen-Hadria, Voice Anonymization in Urban Sound Recordings, 2019, UMR STMS 9912M / Sorbonne Universite, IRCAM, CNRS, France.
Fahimeh Bahmaninezhad, Convolutional Neural Network Based Speaker De-Identification, Odyssey 2018, The Speaker and Language Recognition Workshop, Jun. 26-29, 2018, Les Sables d'Olonne, France, pp. 255-260.
Fuming Fang, Speaker Anonymization Using X-Vector and Neural Waveform Models, National Institute of Informatics, Tokyo, Japan, May 30, 2019.
Hui YE, Quality-enhanced voice morphing using maximum likelihood transformations. IEEE Transactions on Audio, Speech, and Language Processing. Jun. 19, 2006;14(4):1301-12.
Jaime Lorenzo-Trueba, Towards achieving robust universal neural vocoding. InProc. Interspeech 2019 (vol. 2019, pp. 181-185).
Denis Stadniczuk, An open-source Octave toolbox for VTLN-based voice conversion. InProc. International Conference of the German Society for Computational Linguistics and Language Technology, Darmstadt, Germany Sep. 2013.
Fuming Fang, Speaker Anonymization Using X-vector and Neural Waveform Models. arXiv preprint arXiv:1905.13561. May 30, 2019.
Sajedur Rahman, Pitch shifting of voices in real-time. Computer Engineering.;2:35163.
Ido Cohn, Audio De-identification: A New Entity Recognition Task. arXiv preprint arXiv:1903.07037. Mar 17, 2019.
Ryan Prenger, Waveglow: A flow-based generative network for speech synthesis. InICASSP 2019-2019 IEEE International Conference on Acoustics, Speech and Signal Processing (ICASSP) May 12, 2019 (pp. 3617-3621). IEEE.
Mohamed Abou-Zleikha, A discriminative approach for speaker selection in speaker de-identification systems. In2015 23rd European Signal Processing Conference (EUSIPCO) Sep. 4, 2015 (pp. 2102-2106). IEEE.
Qin Jin, Speaker de-identification via voice transformation. In2009 IEEE Workshop on Automatic Speech Recognition & Understanding 2009 (pp. 529-533). IEEE.
Fahimeh Bahmaninezhad, Convolutional Neural Network Based Speaker De-Identification. InOdyssey 2018 (pp. 255-260).
Ching-Hsiang Ho Formant model estimation and transformation for voice morphing. InSeventh International Conference on Spoken Language Processing 2002.
Lifa Sun, Phonetic posteriorgrams for many-to-one voice conversion without parallel data training. In2016 IEEE International Conference on Multimedia and Expo (ICME) Jul. 11, 2016 (pp. 1-6). IEEE.
David Snyder, X-vectors: Robust dnn embeddings for speaker recognition. In2018 IEEE International Conference on Acoustics, Speech and Signal Processing (ICASSP) Apr. 15, 2018 (pp. 5329-5333). IEEE.
Nal Kalchbrenner, Efficient neural audio synthesis. arXiv preprint arXiv:1802.08435. Feb. 23, 2018.

* cited by examiner $$L = aS_{ID} + bS_{ID} + cS_{ID}$$

1100

1110

1120

1130

TRAINING A VOICE MORPHING APPARATUS

FIELD

The invention is related to and in the field of audio processing devices and, more specifically, to an apparatus for morphing a human voice, of which some embodiments are relate to training a voice morphing apparatus and some embodiments are used in the field of speech processing.

BACKGROUND

Recent advances in computing have raised the possibility of realizing many long sought-after voice-control applications. For example, improvements in statistical models, including practical frameworks for effective neural network architectures, have greatly increased the accuracy and reliability of previous speech processing systems. This has been coupled with a rise in wide area computer networks, which offer a range of modular services that can be simply accessed using application programming interfaces. Voice is quickly becoming a viable option for providing a user interface.

However, voice has a disadvantage when compared to text or other graphical input methods, namely that it is often easy to identify a particular speaker from captured speech. In many cases, it may be desired to use voice as an input interface but avoid a possibility of identifying the speaker. For example, a user may wish to make a voice enquiry without being identified and/or tracked. As a comparison, web browsers provide a private browsing or "incognito" mode that limits an amount of personal information that is exchanged with Internet servers. It would be useful to allow a similar mode for voice input. Voice anonymity may also be useful for allowing the exchange of voice data to train large linguistic neural network models. Often supervised learning models require labelled data, which involves manually labelling voice samples. It would be advantageous to anonymize voice data before it is sent to labelers.

Fahimeh Bahmaninezhad et al. in the paper "Convolutional Neural Network Based Speaker De-Identification" presented at Odyssey 2018, The Speaker and Language Recognition Workshop in Les Sables d'Olonne, France (the contents of which are incorporated herein by reference), describe a method of concealing speaker identity in speech signals. The proposed speaker de-identification system maps a voice of a given speaker to an average (or gender-dependent average) voice. The mapping is modeled by a new convolutional neural network (CNN) encoder-decoder architecture. The method is tested on the voice conversion challenge 2016 (VCC-2016) database.

Providing speaker de-identification and voice anonymity is difficult. Many existing systems seek to map a source speaker onto a target speaker, or an average of target speakers. However, it is easy for trained neural network systems to produce unintelligible or heavily distorted outputs that destroy the information carried in the voice signal. Additionally, comparative systems such as that proposed by Fahimeh Bahmaninezhad map distinctive characteristics of input speech to different but still distinctive characteristics in the output speech, allowing some form of identification. It is also difficult to de-identify a speaker yet maintain non-identifying characteristics of speech audio such as noise, gender and accent.

Therefore, what is needed are systems and methods for voice modification to allow for user anonymity and privacy.

SUMMARY

Aspects and embodiments of the invention are set out in the independent claim(s).

In accordance with various aspects and embodiments of the present invention, there is provided a method of training a voice morphing apparatus. The method includes evaluating an objective function for a plurality of data samples, each data sample including an input for the voice morphing apparatus, the objective function being defined as a function of at least an output of the voice morphing apparatus, the objective function including: a first term based on speaker identification, the first term modifying the objective function proportional to a measure of speaker identification based on at least the output of the voice morphing apparatus; and a second term based on audio fidelity of at least the output of the voice morphing apparatus, the second term modifying the objective function proportional to a measure of audio fidelity between the output and the input of the voice morphing apparatus. The method further includes adjusting parameters of the voice morphing apparatus based on the evaluating.

In accordance with some aspects and embodiments of the invention, by training a voice morphing apparatus using input audio data, e.g. unlabeled voice samples, and terms that are in opposition, a certainty of speaker identification may be reduced, effectively masking a speaker's identity while maintaining an audio fidelity, e.g. maintaining audio data that sounds like speech and may be processed by conventional speech processing systems. The objective function may include a loss function, in which case the first term may increase the loss based on a certainty or confidence of speaker identification and the second term may decrease the loss based on a similarity of the input and output.

In accordance with various aspects, the voice morphing apparatus includes an artificial neural network architecture and adjusting parameters of the voice morphing apparatus includes applying a gradient descent method to a derivative of the objective function with respect to the parameters of the artificial neural network architecture. These aspects may thus be implemented using standardized neural network software libraries that provide for custom loss functions.

In accordance with various aspects, the second term is computed using an output of an audio processing component of an automatic speech recognition system. The audio processing component may be used to compute a speaker intelligibility measure for the second term, e.g. by computing a first phoneme recognition score for the input to the voice morphing apparatus using the audio processing component; computing a second phoneme recognition score for the output from the voice morphing apparatus using the audio processing component; and computing the second term for the objective function based on a comparison between the first and second phoneme recognition scores. Re-using existing components of an automatic speech recognition system may allow for easy implementation and also ensures that the voice morphing apparatus is trained consistently with speech processing functions that may be applied to an output of the apparatus. In this case, it may be ensured that the voice morphing apparatus does not overly degrade the accuracy of acoustic models that may be applied to morphed voices.

In accordance with various aspects, the method comprises comparing a spectrogram for the input to the voice morphing apparatus and a spectrogram for the output of the voice morphing apparatus; and computing the second term for the objective function based on the comparison. This may ensure that audio features are suitably conserved despite the voice being morphed, e.g. such that the audio still sounds "voice-like" and maintains similar-sounding transient and constant noise.

In accordance with various aspects, the first term is computed using an output of a speaker identification component of an automatic speech recognition system. The first term is based on a certainty score output by the speaker identification component. In certain cases, the first term may be computed by computing a first speaker identification vector for the input to the voice morphing apparatus using the speaker identification component; computing a second speaker identification vector for the output from the voice morphing apparatus using the speaker identification component; and comparing the first and second speaker identification vectors. Again, using existing speech processing components reduces the implementational complexity. Comparing an output of parallel speaker identification processes may provide one way of measuring a change in speaker identification ability.

In accordance with various aspects, the objective function comprises one or more further terms based on one or more of: a gender classification using at least the output of the voice morphing apparatus; and an accent classification using at least the output of the voice morphing apparatus, wherein the one or more further terms are weighted to either maintain or move away from one or more of a gender classification and an accent classification. In one aspect, one of more classifiers may be used to determine one or more further terms that allow for certain characteristics of a voice to be maintained despite a masking of the speaker identify. For example, applying gender and accent classifiers may allow for gender and accent to be maintained. In certain aspects the one or more further terms are based on a comparative score between a classification applied to the input of the voice morphing apparatus and a classification applied to the output of the voice morphing apparatus and input data is preselected to provide a defined distribution of voice characteristics.

In accordance with one aspect, there is provided a system for training a voice morphing apparatus, the system comprising a voice morphing apparatus configured to evaluate an objective function for a plurality of data samples, each data sample comprising an input for the voice morphing apparatus, the objective function being defined as a function of at least an output of the voice morphing apparatus. The objective function comprises a first term based on speaker identification, the first term modifying the objective function proportional to a measure of speaker identification based on at least the output of the voice morphing apparatus and a second term based on audio fidelity of at least the output of the voice morphing apparatus, the second term modifying the objective function proportional to a measure of audio fidelity between the output and the input of the voice morphing apparatus. The system being further configured to adjust the parameters based on the evaluating.

The voice morphing apparatus may comprise an artificial neural network architecture. The system (for example an objective function evaluator) may adjust the parameters by applying a gradient descent method to a derivative of the objective function with respect to the parameters of the artificial neural network architecture.

The system may further comprise an automatic speech recognition system comprising an audio processing component. The system may compute the second term using an output of the audio processing component. The system may compute a speaker intelligibility measure for the second term using the audio processing component.

The audio processing component may compute a first phoneme recognition score for the input to the voice morphing apparatus and a second phoneme recognition score for the output from the voice morphing apparatus. The system may compute the second term for the objective function based on a comparison between the first and second phoneme recognition scores.

The system may compare a spectrogram for the input to the voice morphing apparatus and a spectrogram for the output of the voice morphing apparatus and compute the second term for the objective function based on the comparison.

The system may comprise a speaker identification component. The system may compute the first term using an output of a speaker identification component. The speaker identification component may output a certainty score. The first term may be based on the certainty score output by the speaker identification component.

The speaker identification component may be used to compute a first speaker identification vector for the input to the voice morphing apparatus. The speaker identification component may be sued to compute a second speaker identification vector for the output from the voice morphing apparatus. The system may compute the first term for the objective function based on a comparison between the first and second speaker identification vectors.

The voice morphing apparatus may be configured to evaluate the objective function further comprising a gender classification using at least the output of the voice morphing apparatus and an accent classification using at least the output of the voice morphing apparatus, wherein the one or more further terms are weighted to either maintain or move away from one or more of a gender classification and an accent classification.

The system may apply a classification to the input of the voice morphing apparatus. The system may apply a classification to the output of the voice morphing apparatus. The one or more further terms may be based on a comparative score between the classification applied to the input of the voice morphing apparatus and the classification applied to the output of the voice morphing apparatus.

The system may pre-select input data to provide a defined distribution of voice characteristics.

In accordance with another aspect, a system for training a voice morphing apparatus is provided. The system comprises a voice morphing apparatus comprising a set of trainable parameters, the voice morphing apparatus being configured to map input audio data to output audio data; a speaker identification system configured to output speaker identification data based on input audio data; and an audio fidelity system configured to output audio fidelity data. The system is configured to pass at least output audio data for the voice morphing apparatus to the speaker identification system and the audio fidelity system, wherein the system is configured to train the voice morphing apparatus using at least a set of input audio data, and wherein an output of the speaker identification system and an output of the audio fidelity system are used by the system to adjust the set of trainable parameters.

This system may provide benefits similar to the above-mentioned method. The voice morphing apparatus may comprise an artificial neural network architecture.

In accordance with various aspects, the speaker identification system is configured to output a score indicative of a confidence of identification for one or more speakers, and wherein the system is configured to evaluate an objective function with a first term based on the score indicative of a confidence of identification, the objective function causing the system to adjust the set of trainable parameters to reduce the score. The speaker identification system may comprise a speaker identification component and the system may be configured to train the voice morphing apparatus to maximize a difference between outputs of the speaker identification component for the input audio data and the output audio data of the voice morphing apparatus. Speaker identification systems may be configured to output confidence or probability data as part of a prediction; this data may thus be re-used to train the voice morphing apparatus.

In accordance with various aspects, the audio fidelity system comprises a speaker intelligibility component, the speaker intelligibility component comprising a speech processing component. The speaker intelligibility component may comprise a phoneme recognition component and the audio fidelity system may be configured to output a measure of similarity based on a difference between outputs of the phoneme recognition component for the input audio data and the output audio data of the voice morphing apparatus, wherein the system is configured to train the voice morphing apparatus to minimize said difference. In this case, existing front-end components of an automatic speech recognition system may be re-purposed to train the voice morphing apparatus to maintain an intelligibility of morphed speech. The audio fidelity system may further comprise an audio similarity component configured to compare the input audio data and the output audio data of the voice morphing apparatus, wherein the audio fidelity system may be configured to output a measure of similarity based on an output of the audio similarity component, the system being configured to train the voice morphing apparatus to maximize an output of the audio similarity component for the input audio data and the output audio data. The audio similarity component may be configured to generate a score indicative of a spectrogram similarity. This may help train the voice morphing apparatus to morph speech in a manner that retains speech or voice-like audio characteristics, despite a masking of the speaker identity.

In accordance with various aspects, the system comprises one or more voice feature classifiers, wherein the system is configured to apply the one or more voice feature classifiers to at least the output audio data for the voice morphing apparatus and to use an output of the one or more voice feature classifiers to adjust the set of trainable parameters for the voice morphing apparatus. These voice feature classifiers may be used as part of an objective or loss function for the training of the voice morphing apparatus to retain or discard (depending on configuration) certain aspects of speech such as gender or accent. The system may be configured to compare outputs of the one or more voice feature classifiers for the input audio data and the output audio data of the voice morphing apparatus and to use an output of the comparison to adjust the set of trainable parameters for the voice morphing apparatus.

In accordance with another aspect, a method of training a voice morphing apparatus is provided. The method comprises mapping, by a voice morphing apparatus comprising a set of trainable parameters, input audio data to output audio data, outputting, by a speaker identification system, speaker identification data based on input audio data, and outputting, by an audio fidelity system, an audio fidelity data, passing at least output audio data for the voice morphing apparatus to the speaker identification system and the audio fidelity system, training the voice morphing apparatus using at least a set of input audio data, and using an output of the speaker identification system and an output of the audio fidelity system to adjust the set of trainable parameters.

The method may comprise outputting a score indicative of a confidence of identification for one or more speakers, and evaluating an objective function with a first term based on the score indicative of a confidence of identification, and adjusting, using the objective function, the set of trainable parameters to reduce the score.

The speaker identification system may comprise a speaker identification component. The method may comprise training the voice morphing apparatus to maximize a difference between outputs of the speaker identification component for the input audio data and the output audio data of the voice morphing apparatus.

The audio fidelity system may comprise a speaker intelligibility component, the speaker intelligibility component may comprise a speech processing component. The speaker intelligibility component may comprise a phoneme recognition component.

The method may further comprise outputting, by the audio fidelity system, a measure of similarity based on a difference between outputs of the phoneme recognition component for the input audio data and the output audio data of the voice morphing apparatus, and training the voice morphing apparatus to minimize said difference.

The audio fidelity system may comprise an audio similarity component. The method may further comprise comparing, by the audio similarity component, the input audio data and the output audio data of the voice morphing apparatus, outputting, by the audio fidelity system, a measure of similarity based on an output of the audio similarity component and training the voice morphing apparatus to maximize an output of the audio similarity component for the input audio data and the output audio data.

The method may further comprise generating, by the audio similarity component, a score indicative of a spectrogram similarity.

The method may further comprise applying one or more voice feature classifiers to at least the output audio data for the voice morphing apparatus and using an output of the one or more voice feature classifiers to adjust the set of trainable parameters for the voice morphing apparatus. The method may further comprise comparing outputs of the one or more voice feature classifiers for the input audio data and the output audio data of the voice morphing apparatus and using an output of the comparison to adjust the set of trainable parameters for the voice morphing apparatus.

In accordance with another aspect, a voice morphing apparatus is provided. The voice morphing apparatus may comprise a neural network architecture to map input audio data to output audio data, the input audio data comprising a representation of speech from a speaker, the neural network architecture comprising a set of parameters, the set of parameters being trained to reduce a speaker identification score from the input audio data to the output audio data and to optimize a speaker intelligibility score for the output audio data.

The voice morphing apparatus of this aspect may be used to morph speech in a manner that hides or masks a speaker identity. This may be useful for anonymizing speech data and/or for providing private voice queries.

In accordance with various aspects, the voice morphing apparatus may comprise a noise filter to pre-process the input audio data, wherein the noise filter is configured to remove a noise component from the input audio data and the voice morphing apparatus is configured to add the noise component to output audio data from the neural network architecture. This may enable noise to be isolated from the system to increase a stability of training and/or preserve noise features of the audio data for use as a subsequent speech data training set.

In accordance with various aspects, the neural network architecture comprises one or more recurrent connections. For example, an output of the neural network architecture may be fed back as an input for future outputs, e.g. may form part of an input for a later time step.

In certain aspects, the voice morphing apparatus may be configured to output time-series audio waveform data based on the output audio data from the neural network architecture. In one case, the voice morphing apparatus may directly output time series audio data; in another case, the voice morphing apparatus may output spectrogram data that may be converted to time series audio data.

In an aspect, a method for using a voice morphing apparatus is provided. The method comprises mapping, via a neural network architecture, input audio data to output audio data, the input audio data comprising a representation of speech from a speaker, the neural network architecture comprising a set of parameters and training the set of parameters to reduce a speaker identification score from the input audio data to the output audio data and to optimize a speaker intelligibility score for the output audio data.

The method may further comprise pre-processing the input audio data with a noise filter. The method may further comprise removing, by the noise filter, a noise component from the input audio data and adding, by the voice morphing apparatus, the noise component to output audio data from the neural network architecture. The neural network architecture may comprise one or more recurrent connections.

The method may further comprise outputting, by the voice morphing apparatus, time-series audio waveform data based on the output audio data from the neural network architecture.

According to another aspect, a non-transitory computer-readable storage medium may be provided that stores instructions which, when executed by at least one processor, cause the at least one processor to: load input audio data from a data source; input the input audio data to a voice morphing apparatus, the voice morphing apparatus comprising a set of trainable parameters; process the input audio data using the voice morphing apparatus to generate morphed audio data; apply a speaker identification system to at least the morphed audio data to output a measure of speaker identification; apply an audio fidelity system to the morphed audio data and the input audio data to output a measure of audio fidelity; evaluate an objective function based on the measure of speaker identification and the measure of audio fidelity; and adjust the set of trainable parameters for the voice morphing apparatus based on a gradient of the objective function, wherein the objective function is configured to adjust the set of trainable parameters to optimize the measure of audio fidelity between the morphed audio data and the input audio data and to modify the measure of speaker identification.

According to another aspect, there is provided a method for training a voice morphing apparatus. The method comprises loading input audio data from a data source, inputting the input audio data to the voice morphing apparatus, the voice morphing apparatus comprising a set of trainable parameters, processing the input audio data using the voice morphing apparatus to generate morphed audio data, applying a speaker identification system to at least the morphed audio data to output a measure of speaker identification, applying an audio fidelity system to the morphed audio data and the input audio data to output a measure of audio fidelity, evaluating an objective function based on the measure of speaker identification and the measure of audio fidelity; and adjusting the set of trainable parameters for the voice morphing apparatus based on a gradient of the objective function, wherein the objective function is configured to adjust the set of trainable parameters to optimize the measure of audio fidelity between the morphed audio data and the input audio data and to modify the measure of speaker identification.

DETAILED DESCRIPTION

Introduction

Figure 1:
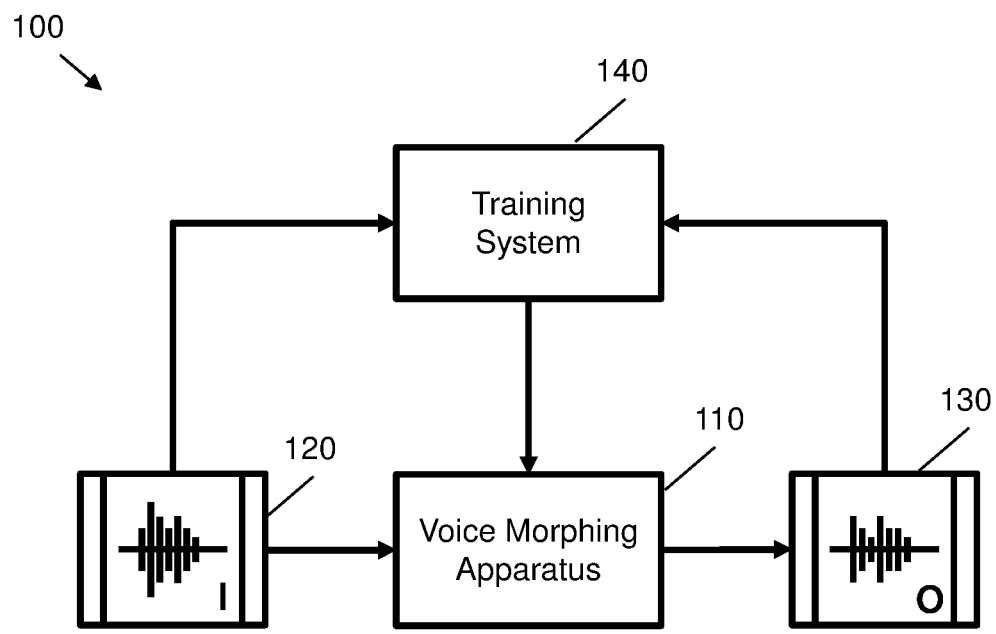
FIG. 1 is a schematic illustration showing a system for training a voice morphing apparatus according to an embodiment and an aspect of the invention.

The following describes various embodiments of the present technology that illustrate various interesting aspects. Generally, embodiments can use the described aspects in any combination. All statements herein reciting principles, aspects, and embodiments are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "embodiments" or similar language means that a particular aspect, feature, structure, or characteristic described in connection with the embodiment is included in at least one embodiment. Thus, appearances of the phrases "in one case," "in at least one embodiment," "in an embodiment," "in certain cases," and similar language throughout this specification may, but do not necessarily, all refer to the same embodiment or similar embodiments. Furthermore, aspects and embodiments described herein are merely by way of example, and should not be construed as limiting of the scope or spirit of the invention as appreciated by those of ordinary skill in the art. The invention is effectively made or used in any embodiment that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In embodiments showing multiple similar elements, such as storage devices, even if using separate reference numerals, some such embodiments may work with a single element filling the role of the multiple similar elements.

Certain embodiments described herein relate to training a voice morphing apparatus. A voice morphing apparatus comprises a device that takes input audio data and generates modified output audio data. The audio data may comprise raw waveforms, e.g. one or more channels of pressure or microphone membrane displacement measurements over time, and/or processed audio data, including frequency measurements and spectrograms. The voice morphing apparatus may operate upon a series of time steps to generate output audio data with a plurality of samples over time. In one case, the input audio data and the output audio data may have a common time base, e.g. a sample of output audio data is generated for every sample of input audio data. In certain cases, the voice morphing apparatus may be configured to generate an output waveform that may be played as a sound recording; in other cases, a further component may take output audio from the voice morphing apparatus, e.g. in the form of frequency or spectrogram samples, and generate an output waveform that may be rendered. The voice morphing apparatus may be applied online (e.g. to real-time speech capture) and/or offline (e.g. to batches of pre-recorded speech segments). In certain cases, the voice morphing apparatus may be configured to use the output audio data to replace the input audio data, e.g. modify an audio file in-place.

In embodiments described herein the voice morphing apparatus is configured to modify input audio data to morph a voice present in the audio data. Morphing a voice may comprise changing one or more aural characteristics of the voice. In embodiments described herein, the voice is morphed to hide an identity of a speaker, e.g. such that a particular voice audible in the output audio data is not distinguishable as the same voice audible in the input audio data. The audio data is processed by the voice morphing apparatus such that speech is minimally distorted by the morphing, e.g. such that a person and/or an automatic speech recognition system may still successfully process the speech despite a morphed voice.

Training System for a Voice Morphing Apparatus

FIG. 1 shows an embodiment 100 of a voice morphing apparatus 110. The voice morphing apparatus 110 receives input audio data 120 and maps this to output audio data 130. The input audio data 120 and output audio data 130 may have the same or different audio formats. In one case, one or more of the input audio data 120 and output audio data 130 comprise one or more time samples of Pulse Code Modulation (PCM) digital audio (e.g. sampled and quantized analog audio amplitude measurements). In this case, the audio data may comprise time series measurements from one or more audio capture devices (e.g., one or more microphones). For example, one or more channels of PCM data may be captured at a predefined sampling rate (e.g., 8 kHz or 44.1 kHz), where each sample is represented by a predefined number of bits (e.g., 8, 16 or 24 bits per sample—where each sample comprise an integer or float value). In another case, one or more of the input audio data 120 and output audio data 130 comprise processed audio data. Processing may comprise, e.g., filtering in one or more of the time and frequency domains, applying beam forming and noise reduction, and/or filtering and normalization. In one case, one or more of the input audio data 120 and output audio data 130 may comprise measurements over time in the frequency domain, e.g., by performing the (Fast) Fourier Transform, and/or one or more filter bank outputs, e.g. filter banks may be applied to determine values for one or more frequency domain features, such as Mel-Frequency Cepstral Coefficients. In a certain case, one or more of the input audio data 120 and output audio data 130 may comprise one or more frames of spectrogram data, e.g. two-dimensional data that extends over time and a measurement domain (such as the frequency domain or Mel values). Spectrograms may be likened to an image of a small window of a sound recording. It should be noted that various forms of audio data may be used, and that audio data may be converted between various representations using various known audio processing components. Audio data as described herein may relate to any measurement made along an audio processing pipeline.

In FIG. 1, the voice morphing apparatus 110 is shown communicatively coupled to a training system 140. The training system 140 adjusts parameters of the voice morphing apparatus 110 so as to provide a desired voice morphing functionality. In FIG. 1, the training system 140 receives the input audio data 120 and the output audio data 130 and uses this to train the voice morphing apparatus 110. In one case, the voice morphing apparatus 110 may comprise an artificial neural network architecture. In this case, the parameters of the voice morphing apparatus 110 may comprise values for one or more of weights and biases for one or more layers of the artificial neural network architecture. In another case, the voice morphing apparatus 110 may comprise a probabilistic model, including one or more of a Hidden Markov Model and a Gaussian Mixture Model, wherein the parameters comprise parameters of the probabilistic model, such as probability distribution parameters. In both cases, the training system 140 may be configured to perform an optimization procedure to optimize the parameter values. The training system 140 is configured to train the voice morphing apparatus 110 using a plurality of training samples, e.g. a plurality of different sets of input audio data 120. A training sample may comprise a segment of audio, e.g. where the segment of audio comprises a plurality of time samples. The segment of audio may comprise a voice query or short voice segment. In FIG. 1, the training system 140 provides a mechanism to train the voice morphing apparatus 110 in an unsupervised manner, as the input audio data 120 does not need labels indicating a particular "ground truth" classification. The plurality of training samples may thus comprise a large database of unlabeled speech samples.

Figure 2:
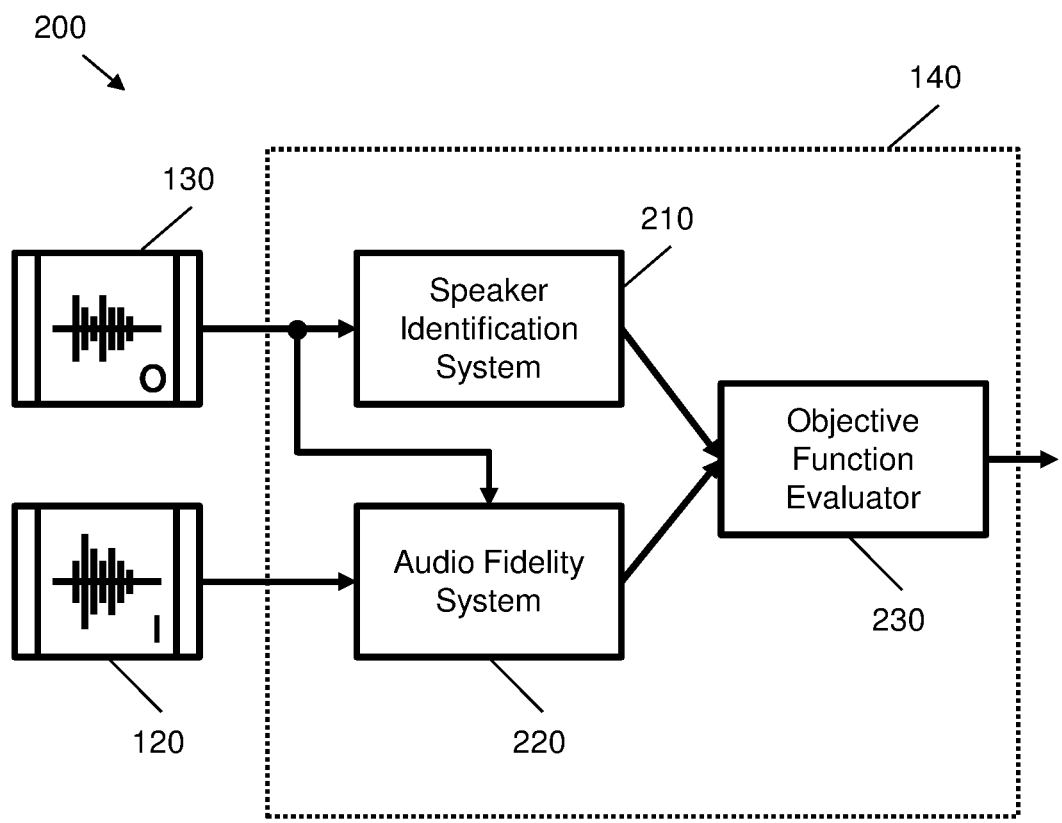
FIG. 2 is a schematic illustration showing components of a training system according to an embodiment and an aspect of the invention.

FIG. 2 shows an embodiment 200 that illustrates a set of components that may form the training system 140. As in FIG. 1, the training system 140 receives input audio data 120 and output audio data 130, the latter resulting from an application of the voice morphing apparatus 110. The training system 140 of FIG. 2 comprises a speaker identification system 210, an audio fidelity system 220 and an objective function evaluator 230. In this embodiment, the speaker identification system 210 receives the output audio data 130. In later embodiments, it is also shown how the speaker identification system 210 may also receive the input audio data 120.

The speaker identification system 210 is configured to process at least the output audio data 130 to determine a measure of speaker identification. This measure of speaker identification may comprise one or more confidence values. In one case, the measure of speaker identification may comprise a probability indicating whether the speaker identification system 210 can successfully identify a speaker. For example, a value of 0.5 may indicate that the speaker identification system 210 has a confidence of 50% in an identification of a speaker featured in the output audio data 130. Or put another way, a value of 0.5 may indicate that a highest probability for a speaker classification (e.g. a maximum likelihood value) is 50%, e.g. the most likely speaker is speaker X who has a probability value of 50%. Different methods may be used to generate the measure of speaker identification as long as the measure is output within a predefined range (e.g. a normalized range of 0 to 1 or an 8-bit integer value between 0 and 255). The output of the speaker identification system 210 may comprise a normalized scalar value. In one case, the speaker identification system 210 may apply a hierarchical identification, e.g. perform a first identification to determine a set of speakers and then perform a second identification to determine a speaker within the determined set. In this case, the measure of speaker identification may comprise a probability from the second identification or an aggregate value (e.g. an average) across the set of hierarchical stages.

The audio fidelity system 220, in the embodiment of FIG. 2, is configured to process the input audio data 120 and the output audio data 130 to determine a measure of fidelity between the input audio data 120 and the output audio data 130. The measure of fidelity may represent a measure of the similarity of the audio inputs to the audio fidelity system 220. The term "fidelity" is used herein to represent a measure of the exactness or faithfulness of replication of a copy of an audio signal to a comparative audio signal. The form of "audio fidelity" being analyzed by the audio fidelity system 220 is fidelity of all features of a voice signal that do not make a speaker's identity distinguishable by the sound of voice. This can include preservation of noise and other non-speech sounds. In FIG. 2, this is determined by comparing the input audio data 120 and the output audio data 130. In other embodiments, the measure of fidelity may be generated based on the output audio data 130 alone, e.g. if the input audio data 130 is presumed to represent voice audio data, a comparison may be made with a generalized model of voice audio data instead of the specific input audio data 130. The audio fidelity system 220 may also output a normalized scalar value in a similar manner to the speaker identification system 210.

In FIG. 2, the outputs of the speaker identification system 210 and the audio fidelity system 220 are received by the objective function evaluator 230. The objective function evaluator 230 is configured to evaluate an objective function that comprises a function of the outputs of the speaker identification system 210 and the audio fidelity system 220. For example, the objective function may comprise a first term that is based on the output of the speaker identification system 210 and a second term that is based on the output of the audio fidelity system 220. The term "objective function" is used as per the art of model optimization. The objective function may comprise a function of a set of trainable parameters for the voice morphing apparatus 110. The objective function may thus be evaluated to optimize the function by adjusting the trainable parameters. An objective function may be optimized by attempting to maximize or minimize a value of the function. Both maximization and minimization may have the same effect, depending on how the terms are presented (e.g. a function to be maximized may be converted to a minimization problem via inversion). In a case, where the objective function is to be minimized, it may be referred to as a cost function. A loss function may form part of the cost function and may comprise a function applied to each individual training sample or data point during training, e.g. in a minimization example, the objective function may comprise a loss function that has the first term and the second term and that is applied to the input audio data 120 and the output audio data 130.

As shown in FIG. 1, an output of the objective function evaluator 230 may be used to adjust the parameters of the voice morphing apparatus 110. Different optimization methods may be used to adjust the parameters of the voice morphing apparatus 110. A common optimization method is gradient descent. In this case, the objective function evaluator 230 may be configured to evaluate the objective function by determining a derivative of the objective function with respect to the parameters of the voice morphing apparatus 110. The derivative may then be used to determine a gradient towards an extremum of the objective function. In one case, the objective function evaluator 230 determines values for the gradient of the objective function and uses these to update the parameters of the voice morphing apparatus 110, e.g. the parameters may be updated so as to modify the parameters in the "downwards" direction of the gradient towards a local minima. Different gradient descent methods may be applied as known in the art, including stochastic gradient descent or batch/mini-batch gradient descent. Different gradient descent optimization approaches may also be used, such as Adam or RMSProp. In multi-layer neural networks, the chain rule may be used to determine the derivative across the set of layers of the neural network architecture.

By applying the components and systems shown in FIGS. 1 and 2, the parameters of the voice morphing apparatus 110 may be adjusted following training over a plurality of training samples. In each training iteration, input audio data 120 and output audio data 130 may be used to evaluate the objective function, which may comprise evaluating a loss function. The objective function has terms that relate to both speaker identification and audio fidelity. The speaker identification term in the objective function acts to adjust the parameters to reduce a speaker identification, e.g. to make it harder for the speaker identification system 210 to identify the speaker. The audio fidelity term in the objective function acts to adjust the parameters to maintain an audio fidelity, e.g. to keep the output audio data 130 sounding like a normal voice. By applying both terms together, the parameters may be adjusted to achieve both aims. The voice morphing apparatus 110 is thus configured to generate output audio data 130 that allows for a speaker to be de-identified yet still allows the voice data to be processed by speech processing systems and understood by human listeners.

In certain embodiments, the training system 140 may be implemented using machine learning libraries such as TensorFlow or PyTorch. These libraries provide interfaces for defining neural network architectures and for performing training. These libraries allow for custom loss definitions and these may be used to implement the custom objective functions described herein. In these cases, a derivative of the objective function may be determined automatically using the methods of the libraries, e.g. by using the chain rule and automatic differentiation along a compute graph.

Re-Use of Speech Processing Components

In certain embodiments, one or more of the speaker identification system 210 and the audio fidelity system 220 may comprise existing components of an automatic speech recognition system.

The speaker identification system 210 may comprise a component or module in a speech processing pipeline that identifies a speaker. The speaker identification system 210 may comprise a Hidden Markov Model and/or Gaussian Mixture Model system for speaker identification or a neural network architecture for speaker identification, e.g. such as a system based on x-vectors as described in the paper by Snyder, David, et al. "X-vectors: Robust DNN embeddings for speaker recognition." 2018 IEEE International Conference on Acoustics, Speech and Signal Processing (ICASSP). IEEE, 2018 (the contents of which are incorporated herein by reference). In the case that the speaker identification system 210 comprises a neural network architecture, the parameters of the speaker identification system 210 may be fixed when training the voice morphing apparatus 110 (i.e. the parameters of the speaker identification system 210 are not trained when training the voice morphing apparatus 110).

The audio fidelity system 220 may also comprise one or more audio processing components or modules of an automatic speech recognition system. In one case, the audio fidelity system 220 may comprise a phoneme recognition system or acoustic model. This may again be a probabilistic model or a neural network architecture. In one case, the audio fidelity system 220 may comprise an acoustic model that receives at least the output audio data 130 and determines a confidence or probability vector for a set of available phones, phonemes and/or graphemes. Like the speaker identification system 210 described above, an output of the audio fidelity system 220 may comprise a function of this confidence or probability vector. However, unlike the output of the speaker identification system 210, in this case it is desired to maximize the values of the confidence or probability vector, e.g. to have a strong positive identification of linguistic features such as phonemes within the output audio data 130. As above, in the case that the audio fidelity system 220 comprises one or more neural network architectures, the parameters of the audio fidelity system 220 may be fixed when training the voice morphing apparatus 110 (i.e. the parameters of the audio fidelity system 220 are not trained when training the voice morphing apparatus 110). As the parameters of the two systems are fixed, they may be treated as constants in any automatic differentiation of the objective function.

The present embodiments thus provide for a form of adversarial training of the voice morphing apparatus 110 using existing components of an automatic speech recognition system or related speech processing technologies. This makes the training system 140 easy to implement, as existing computer program code and/or hardware devices may be applied in a modular manner to build the training system 140 and output data for use in evaluating an objective function for the voice morphing apparatus 110. One or more of the speaker identification system 210 and the audio fidelity system 220 may comprise front-end components of an automatic speech recognition system, such that a full speech processing pipeline does not need to be applied to train the voice morphing apparatus 110.

Comparative Systems

Figure 3:
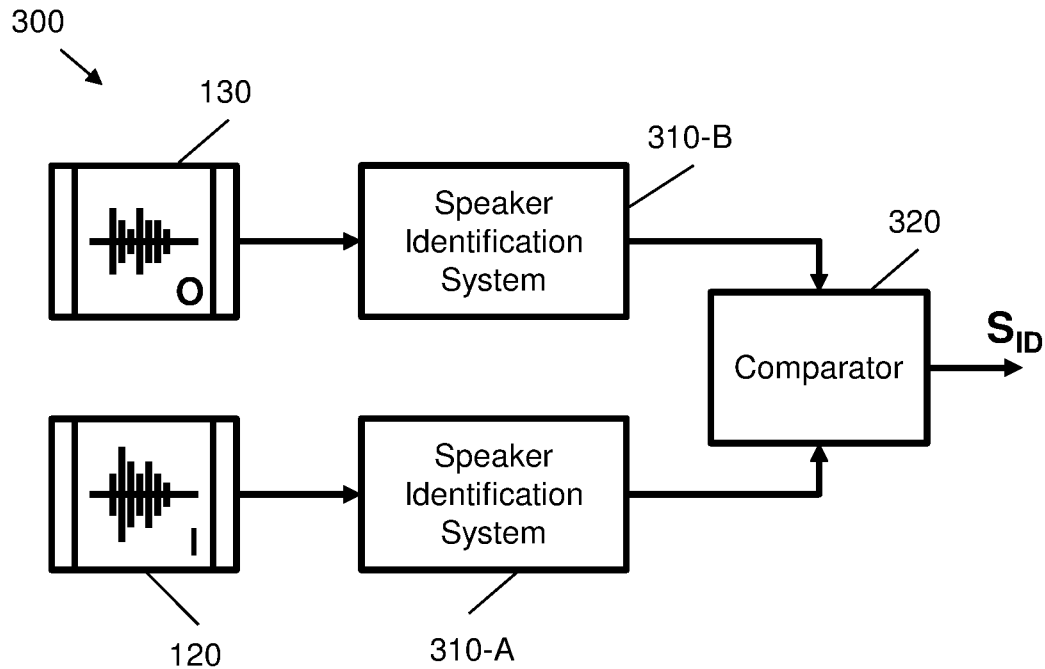
FIG. 3 is a schematic illustration showing computation of a measure of speaker identification according to an embodiment and an aspect of the invention.
Figure 4:
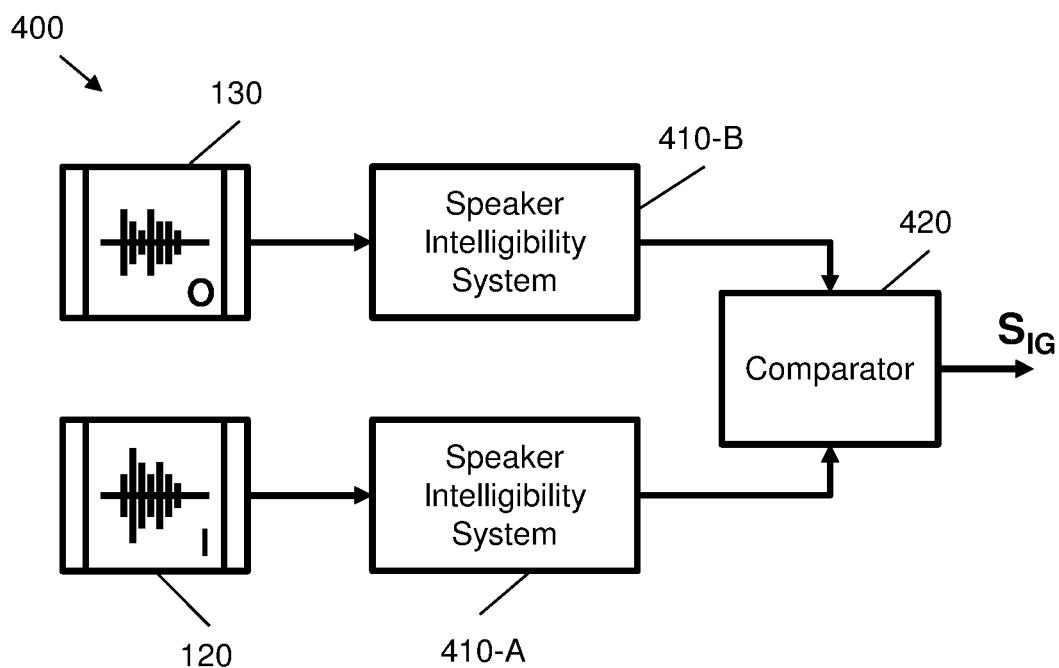
FIG. 4 is a schematic illustration showing computation of a measure of speaker intelligibility according to an embodiment and an aspect of the invention.
Figure 5:
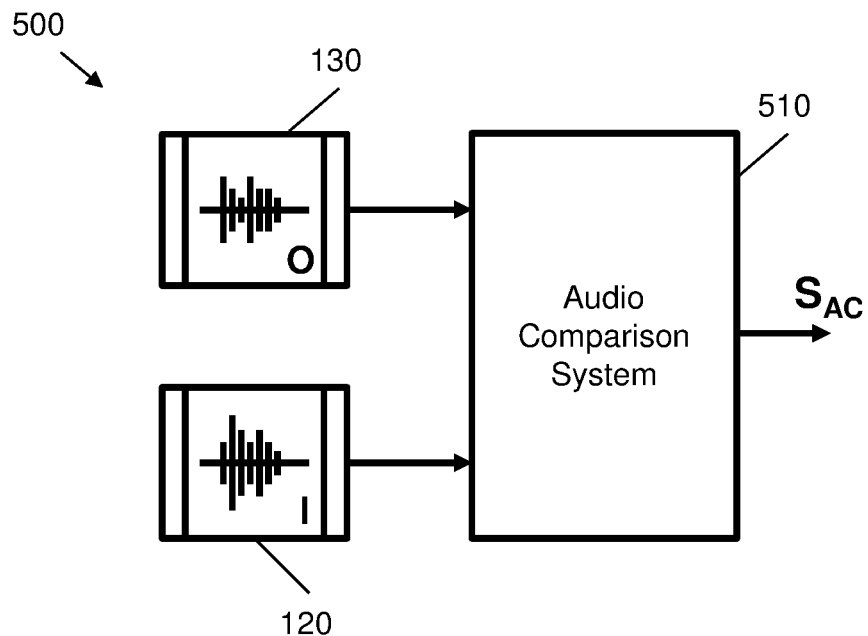
FIG. 5 is a schematic illustration showing computation of a measure of audio similarity according to an embodiment and an aspect of the invention.

FIGS. 3 to 5 show embodiments that may be used in certain cases to implement the speaker identification system 210 and the audio fidelity system 220 of FIG. 2. These embodiments operate based on a comparison between outputs generated based on each of the input audio data 120 and the output audio data 130. In other embodiments, e.g. as described above, only the output audio data 130 may be used (this is described in a later embodiment).

FIG. 3 shows an embodiment whereby a common speaker identification system 310 is applied independently to both the input audio data 120 and the output audio data 130. FIG. 3 shows two instances of the speaker identification system 310-A and 310-B. These may represent, e.g., two calls to a common Application Programming Interface (API) with different data, use of two parallel hardware processing units and/or use of a common hardware processing unit at two different points in time. In one case, the two instances of the speaker identification system 310-A and 310-B may be applied in parallel to the input audio data 120 and the output audio data 130 to speed up training (e.g. using two parallel hardware device or two parallel processor threads executing a common set of computer program code). Outputs from the two instances of the speaker identification system 310-A and 310-B are passed to a comparator 320. The first instance of the speaker identification system 310-A computes a first speaker identification vector for the input audio data 120 and the second instance of the speaker identification system 310-B computes a second speaker identification vector for the output audio data 120. These scores may comprise confidence or probability values as discussed above. The comparator 320 compares the first and second speaker identification vector to output a combined speaker identification score $S_{ID}$ based on distance between the vectors that may be used by the objective function evaluator 230. In one case, the speaker identification systems 310 may output a probability vector across a set of speakers. In this case, the comparator 320 may evaluate a function of the two scores, such as a Euclidian distance or other distance measure. In the case, where the speaker identification systems 310 output a scalar score value, the comparator 320 may subtract the output of the second instance of the speaker identification system 310-B from the first instance of the speaker identification system 310-A. It may be desired to maximize, in a loss function, a distance between the second speaker identification vector and the first speaker identification vector, where this distance indicates a measure of speaker de-identification. Although the speaker identification system 310 is deemed to output a score in the present embodiment, in other cases a different form of output may be processed by the comparator 320 to determine a measure of speaker identification.

FIG. 4 shows a similar setup for the certain components of the audio fidelity system 220. In FIG. 4, the audio fidelity system 220 comprises a speaker intelligibility system 410. This may comprise a phoneme recognition component or acoustic model as described above. The speaker intelligibility system 410 is configured to output a score indicative of the intelligibility of speech present within input audio data. Intelligibility may be determined in one or more ways. In one case, intelligibility may indicate a confidence or probability of detecting one or more linguistic features such as phonemes. In another case, intelligibility may be based on an accuracy or confidence of output transcribed text or voice commands. As set out above, the speaker intelligibility system 410 may comprise part of a speech processing pipeline for automatic speech recognition. In this case, an actual text output may be ignored but a confidence value that is provided as part of the output may be used. In other cases, the text output may be used.

As in FIG. 3, FIG. 4 shows two instances of the speaker intelligibility system 410. The first instance of the speaker intelligibility system 410-A computes a first speaker intelligibility score for the input audio data 120 and the second instance of the speaker intelligibility system 410-B computes a second speaker intelligibility score for the output audio data 120. The comparator 420 then compares these two scores to generate a combined speaker intelligibility score $S_{IG}$. In one case, the combined speaker intelligibility score Sic may be based on a change in intelligibility between the input audio data 120 and the output audio data 130. In any loss function, it may be desired to minimize the change in intelligibility.

FIG. 5 shows an embodiment 500 that uses another component that may form part of the audio fidelity system 220. This component comprises an audio comparison system 510. The audio comparison system 510 receives and compares the input audio data 120 and the output audio data 130. The audio comparison system 510 may differ from the speaker intelligibility system 410 by comparing the audio data itself rather than a result of performing speech processing on the data. In one case, the audio comparison system 510 may comprise a difference between spectrograms of the audio data, e.g. frequency, Mel or bark spectrograms. In certain cases, the audio comparison system 510 may only compare frequency magnitude features as opposed to frequency phase features, as human hearing is relatively insensitive to phase. The audio comparison system 510 computes an audio comparison score $S_{AC}$. The audio comparison score may comprise a distance metric, e.g. a sum of squares of difference over one or more components of the spectrogram or similar method of comparison. Non-speech features of audio signals such as transient and constant noises have a generally neutral effect on speaker identification but work against speech intelligibility. Training with an objective function that only considers speaker identification and speech intelligibility components would result in the morphing apparatus 110 learning to remove non-speech features. Training with a loss function that includes an audio comparison term $S_{AC}$ causes the morphing apparatus 110 to better preserve audio signal features.

Figure 6:
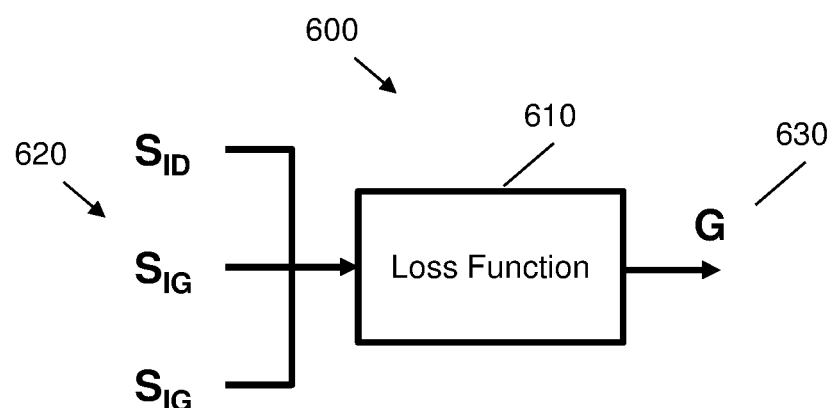
FIG. 6 is a schematic illustration showing computation of a parameter update using a loss function according to an embodiment and an aspect of the invention.

FIG. 6 shows an embodiment 600 wherein the objective function comprises a loss function 610 to be minimized. In this case, the loss function 610 takes as input the three scores from FIGS. 3 to 5. If the speaker identification score $S_{ID}$ comprises a distance measurement then it may be desired to maximize this score; if the speaker intelligibility score $S_{IG}$ and the audio comparison score $S_{AC}$ also comprise distance measurements then it may be desired to minimize these latter scores. As such, in the loss function, a negative weight (e.g. a=−1*positive scalar) may be applied to the speaker identification score $S_{ID}$ and positive weights applied to the speaker intelligibility score $S_{IG}$ and the audio comparison score $S_{AC}$; in this manner, training may seek to minimize the loss function which may in turn attempt to maximize a speaker identification distance. In FIG. 6, the loss function is evaluated to determine gradient terms 630 that are used to modify the parameters of the voice morphing apparatus 110. In the loss function, the speaker identification score $S_{ID}$ is used in a first term and the speaker intelligibility score $S_{IG}$ and the audio comparison score $S_{AC}$ are used in a composite second, audio fidelity, term.

Those skilled in the art will understand that there may be many different ways to construct an objective or loss function with comparative functionality. For example, the comparator 320 may output the speaker identification score $S_{ID}$ as an inverse of a distance measure between speaker identification probability vectors, in which case a positive weight may be applied such that minimizing this term maximizes the distance. The scores may be determined per time samples or may be averaged over a plurality of time samples.

In one case, weights for each score may be predetermined, e.g. so as to give more importance to one or more of the scores. In one case, the scores and/or the weight may be normalized, e.g. such that the weights sum to one and the scores are a value between 0 and 1. In other cases, the weights may comprise parameters that are optimized as part of the training. In yet other cases, the weights may be dynamic and change based on the scores and/or other information associated with the input audio data 120.

Alternative Training Systems

Figure 7:
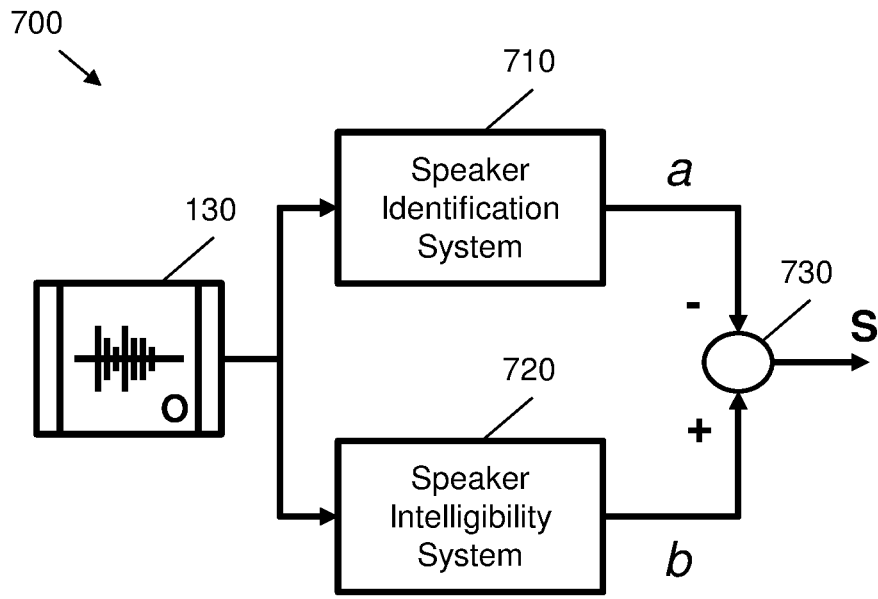
FIG. 7 is a schematic illustration showing components for computing a voice modification metric according to an embodiment and an aspect of the invention.

FIG. 7 shows an alternative embodiment 700 of components of the training system 140. In FIG. 7, only the output audio data 130 is used within the objective function (e.g. is passed to the objective function evaluator 230).

FIG. 7 shows a speaker identification system 710 and a speaker intelligibility system 720 that each receive the output audio data 130. The speaker identification system 710 and the speaker intelligibility system 720 may be similar to the corresponding systems of FIGS. 3 and 4. In this case, both systems may be configured to output a confidence score indicative of a confidence in detection of respective identification and intelligibility features. For example, the speaker identification system 710 may output a score indicating a confidence in identifying a speaker present in the output audio data 130 and the speaker intelligibility system 720 may output a score indicating a confidence in decoding linguistic features present in the output audio data 130. As per previous embodiments, the score may comprise part of an available output of existing automatic speech recognition components. In FIG. 7, the two scores are respectively weighted by weights a and b and are aggregated by aggregator 730. In one case, the aggregator 730 may subtract the output of the speaker identification system 710 from the output of the speaker intelligibility system 720. In another case, the aggregator 730 may compute a ratio of the outputs of the speaker identification system 710 and the speaker intelligibility system 720. If the output of the aggregator 730 is to be minimized this may comprise a function of the speaker identification system output divided by the speaker intelligibility system output, such that modification of the parameters of the voice morphing apparatus 110 reduce the output of the speaker identification system 710 and maximize the output of the speaker intelligibility system 720.

Figure 8:
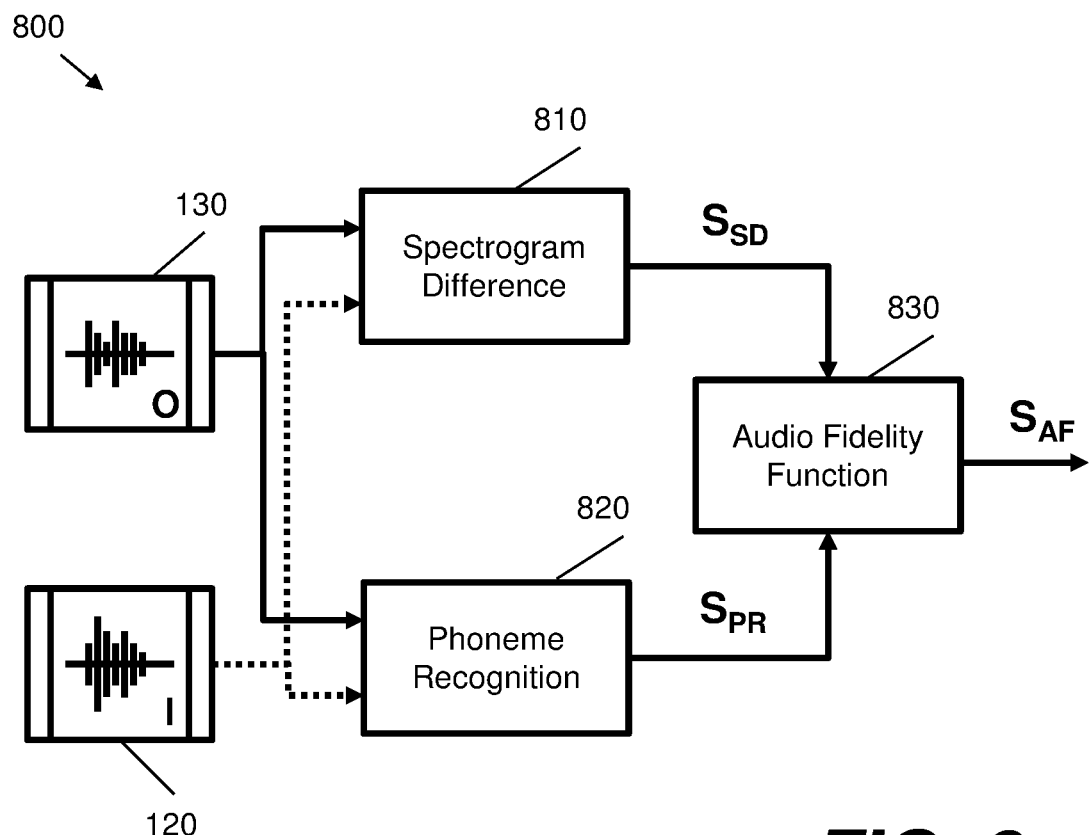
FIG. 8 is a schematic illustration showing computation of a measure of audio fidelity according to an embodiment and an aspect of the invention.

FIG. 8 shows another alternative embodiment 800 that may be used to implement the audio fidelity system 220 in FIG. 2. In FIG. 8, the audio fidelity system 220 comprises a spectrogram difference component 810 and a phoneme recognition component 820. Both components receive the input audio data 120 and the output audio data 130 as inputs (dashed lines have been used for the input audio data 120 for clarity). The spectrogram difference component 810 outputs a spectrogram difference score $S_{SD}$ that indicates an audio distance between spectrograms of the input audio data 120 and the output audio data 130. These spectrograms may comprise Mel spectrograms or bark spectrograms and the spectrogram difference score may comprise a fidelity distance such as a sum of squares of difference over components of the spectrogram. The phoneme recognition component 820 outputs a phoneme recognition score $S_{PR}$ that indicates a measure of speech intelligibility. The output may indicate a change in speech intelligibility between the input audio data 120 and the output audio data 130, e.g. based on linguistic feature probabilities output by an acoustic model. The scores may be determined per time samples or may be averaged over a plurality of time samples. In certain cases, the phoneme recognition score $S_{PR}$ may be based on a difference between the highest and second highest phoneme probability, e.g. measures of how the phoneme probability distributions change due to morphing. In FIG. 8, an audio fidelity function 830 receives the spectrogram difference score $S_{SD}$ and the phoneme recognition score $S_{PR}$ and combines them into a suitable audio fidelity score $S_{AF}$ that is suitable for use in the objective function. In one case, the audio fidelity function 830 may also combine individual scores over time samples to generate a score for a duration of the input and output audio data 120, 130.

In the embodiments, including those of FIGS. 7 and 8, a measure of speech intelligibility is used as this may help reduce the voice morphing apparatus 110 being trained to simply garble speech in a manner that is difficult for humans and speech recognition systems to process. By attempting to minimize successful speaker identification together with maintaining a measure of speech intelligibility (in certain cases as well minimizing a difference in audio features) trains the voice morphing apparatus 110 to produce useful audio output including speech and other features such as transient and constant noise.

Additional Classifiers

Figure 9:
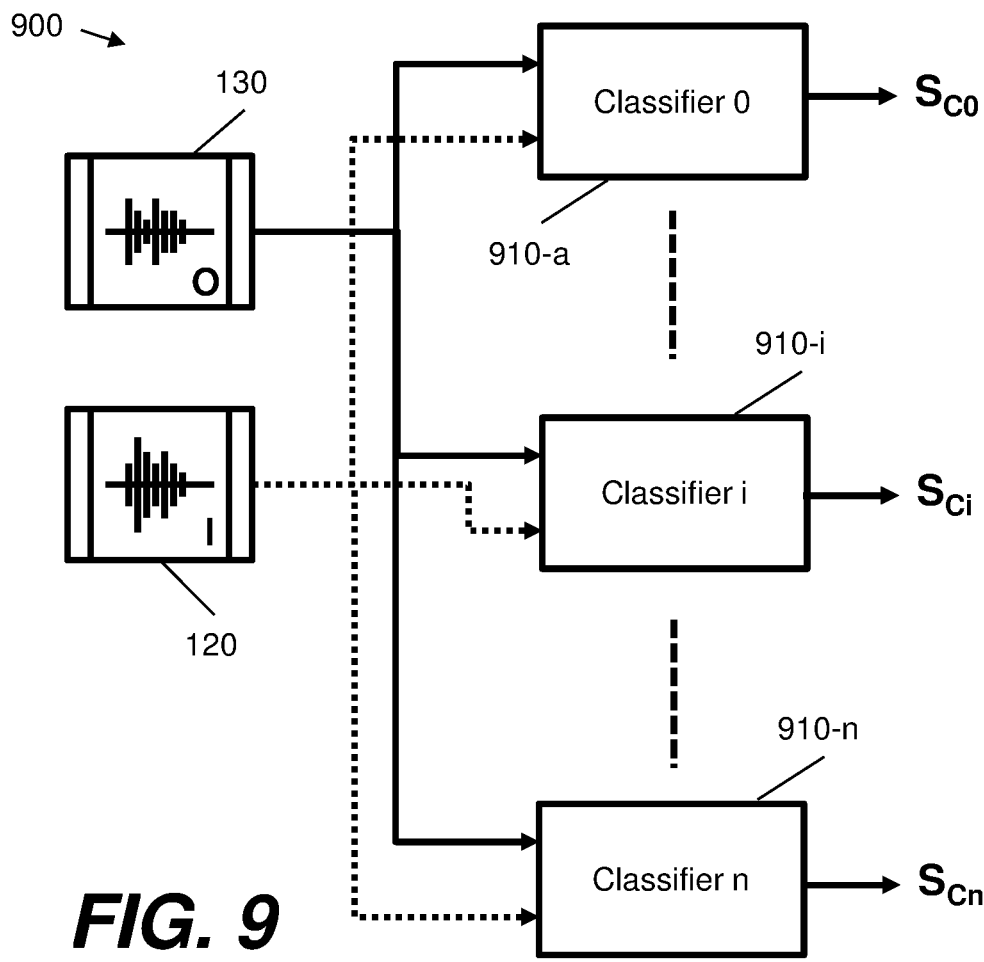
FIG. 9 is a schematic illustration showing a number of classifications to determine objective function terms according to an embodiment and an aspect of the invention.

FIG. 9 shows an embodiment 900 wherein additional factors may be included in the objective function. In FIG. 9, one or more classifiers 910 are included to generate additional scores (e.g. in addition to those shown in FIGS. 3 to 5, 7 and 8) that may be used to train the voice morphing apparatus 110 to preserve (or remove) certain voice features. In FIG. 9, n classifiers 910 are shown. Each classifier receives the input audio data 120 and the output audio data 130. In other embodiments, only the output audio data 130 may be used.

In FIG. 9, each classifier 910 is configured to perform a classification, and compare outputs for the input audio data 120 and the output audio data 130, to generate a classifier score $S_{Ci}$ that may be used in the objective function. The classifiers may relate to one or more voice characteristics such as gender and accent. To train the voice morphing apparatus 110 to preserve a particular voice characteristic (e.g. to keep a female voice female), each classifier score may represent a difference between a common classification applied to both the input audio data 120 and the output audio data 130. For example, the classifier score may be determined as a mean-squared difference between classification probability vectors for each of the input audio data 120 and the output audio data 130. Again, if the classifiers comprise neural network architectures their weights are fixed for the training of the voice morphing apparatus 110. The classifiers may also comprise existing components of an automatic speech recognition pipeline. If the difference is large, then this will show up in the classifier score and a resultant loss function; hence, parameters of the voice morphing apparatus 110 will be adjusted to minimize the distance between classifications and as such preserve the voice features.

In one case, different classifiers may be added or removed in a modular manner to configure the voice morphing apparatus 110 and/or to generate different instances of the voice morphing apparatus 110 that preserve or change different characteristics. In one case, for each feature that is to be changed ("flipped"), a term may be added to a loss function such that, when the loss function is minimized, the difference between a classifier for the feature applied to the input audio data and a classifier for the feature applied to the output audio data is maximized. For example, this may be achieved by using an inverse of the difference between the classifiers for the feature in the loss function.

Noise Filters

Figure 10:
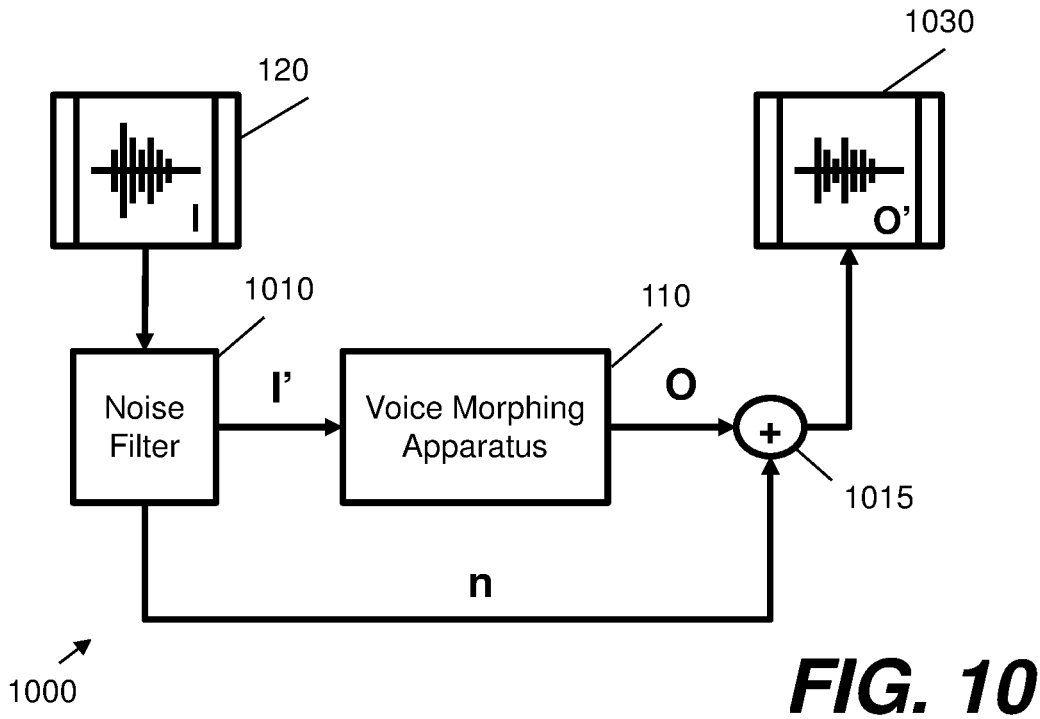
FIG. 10 is a schematic illustration showing a noise filter according to an embodiment and an aspect of the invention.

FIG. 10 shows an embodiment 1000 where a noise filter 1010 is used with the voice morphing apparatus 110. In this embodiment 1000, other elements of the training system 140 have been omitted for clarity and just the input and output audio generation is shown. The noise filter 1010 is configured to receive the input audio data 120 prior to processing by the voice morphing apparatus 110. The noise filter 1010 is arranged to pre-process the input audio data 120. In particular, the noise filter 1010 is arranged to remove a noise component n from the input audio data. This leaves modified input audio data I' that is passed to the voice morphing apparatus 110. The voice morphing apparatus 110 is configured to output audio data O as before. However, in this case, the voice morphing apparatus 110 is trained to map filtered input audio data. It may thus generate a different output audio data than the previous embodiments. In FIG. 10, a summation component 1015 is used to add the noise component n extracted by the noise filter 1010 to the audio data output O by the voice morphing apparatus 110. This then generates modified output audio data 1030 (O') that contains the extracted noise component.

The embodiment of FIG. 10 may be used to improve training by allowing the voice morphing apparatus 110 to concentrate on learning mappings for audio features particular to voice as opposed to also learning how to map noise components. This may be useful for real-world audio samples, such as those obtained from within vehicles or on mobile computing devices, which may have a heavy noise component. In cases where the voice morphing apparatus 110 is a pre-processing step for the generation of training data for an automatic speech recognition system, it may be desired to keep the noise characteristics of the original input audio data 120 as this may be required for robust training. FIG. 10 provides a mechanism where this may be achieved.

In the embodiment of FIG. 10, the noise component n may be any component of the original audio signal that is not used for speaker identification. Put another way, the modified input audio data I' may only comprise information that a speaker identification system needs to identify a speaker. This may not resemble a conventional view (or aural impression) of "speech". In this manner, the filtering and recombining of the noise component n may actually also filter and recombine portions of speech that are not used by the speaker identification system. This may help recognition and fidelity.

Voice Morphing Apparatus

In certain cases, the voice morphing apparatus described herein may be based on a so-called neural vocoder, i.e. a neural network architecture comprising encoder and decoder components. In certain cases, the neural network architectures may only implement a "vocoder decoder" part of a traditional vocoder, e.g. that maps processed audio features into output audio data that may comprise a time-series waveform. When comparing with a traditional vocoder, the "vocoder encoder" part of the neural vocoder may not need to be implemented using a neural network architecture, but instead may be implemented using conventional audio signal processing operations (e.g. the Fast Fourier Transform—FFT—and/or filter banks, taking the magnitude and/or logarithm). In this case, the "vocoder encoder" part of the neural vocoder may not be "neural" but may comprise the audio pre-processing operations described herein. Only the "vocoder decoder" portion of these architectures may comprise a neural network architecture with a set of trainable parameters.

It should also be noted that the neural network architecture may comprise a neural encoder-decoder (e.g. autoencoder-like) architecture as considered from the neural network perspective. This may or may not map onto the traditional encoder-decoder portions of a traditional (non-neural) vocoder. For example, a "vocoder decoder" portion of a vocoder may be implemented using a neural encoder-decoder architecture.

The neural vocoder may comprise one or more recurrent connections. These may not be needed in all embodiments, e.g. convolutional neural network architectures may alternatively use a plurality of frames of audio data including frames before a current frame and frames ahead of a current frame. These approaches may be able to use a sliding window so as to avoid slower recurrent connections (such as found within recurrent neural networks). In one case, the voice morphing apparatus is configured to receive time-series audio waveform data and output time-series audio waveform data; in other cases, the audio data may comprise frequency or Mel features as described. The neural vocoder may comprise one or more convolutional neural network layers and/or one or more feedforward neural network layers. Embodiments of suitable neural vocoder architectures that may be used as a basis for the voice morphing apparatus 110 include those described in "Efficient Neural Audio Synthesis" by Kalchbrenner et al. (published via arXiv on 25 Jun. 2018), "Waveglow: A Flow-Based Generative Network For Speech Synthesis" by Prenger et al. (published via arXiv on 31 Oct. 2018) and "Towards Achieving Robust Universal Neural Vocoding" by Lorenzo-Trueba at al. (published via arXiv on 4 Jul. 2019), all of which are incorporated herein by reference.

Data Distributions

In certain embodiments, the plurality of input audio data 120 is pre-selected to provide a defined distribution of voice characteristics. For example, it may be beneficial to train the voice morphing apparatus described herein on a large data set of voice recordings that feature a diverse range of voices. It may also be recommended to use a large data set of diverse voice content, e.g. a plurality of different phrases as opposed to many different voices repeating a common phrase (such as a wake word).

In certain embodiments, a large range of training samples (e.g. for use as input audio data 120) may be generated or augmented using parametric speech synthesis. In this case, speech samples may be generated by selecting the parameters of the speech synthesis system. For example, a training set may be generated by creating random (or pseudo random) text segments and then using a text-to-speech system to convert the text to audio data. In this case, the parameters of the text-to-speech system may also be randomly sampled (e.g. random or pseudo random selections using inbuilt software library and/or hardware functions) to generate a diverse set of training samples. For example, to ensure diversity, an array of speech synthesis parameter sets can be learned that is able to create speech from text, where the speech has an even distribution of vectors matching a range defined by vectors computed from speech from a broad range of human voices within an embedding space.

Figure 11A:
FIGS. 11A and 11B are schematic charts illustrating feature distributions in embodiment and an aspect of the invention systems.
Figure 11A:

In certain cases, a speaker identification system may itself by trained on a database of audio data from a plurality of different speakers. The speakers that are used to train the speaker identification system may affect the training of the voice morphing apparatus (e.g. when the parameters of the speaker identification system are fixed and are used to train the apparatus in an adversarial manner). For example, in one case, the training method described herein may act to modify the input audio data so as to change a distribution of features that are used for speaker identification, e.g. as may be present in one or more hidden or output layers of a neural speaker identification system. FIG. 11A shows a schematic "toy" example of two possible distributions for a one-dimensional feature for speaker identification. A top distribution 1110 has an even distribution of data points whereas a bottom distribution 1120 has a clustered distribution of data points. When training the voice morphing apparatus, the voice morphing apparatus may learn to modify the input audio data such that the features of the audio data that are used for speaker identification are moved into the space between data points. For a clustered distribution such as 1120 this may comprise a space between groups of data points. How the voice morphing apparatus modifies the input audio data may thus be controlled by controlling for the distribution of data samples in the training data. This may be performed in a pre-processing step that applies the speaker identification system and determines a feature distribution for speaker identification for each data sample. Data samples may then be selected based on these feature distributions. If the data samples are selected to have a diverse set of feature distributions then the voice morphing apparatus may be able to make more stable small modifications to the input audio data that still mask the speaker but that avoid large unpredictable modifications to the input audio data. On the other hand, clustered features may be preferred if it is desired to obfuscate or remove those features, e.g. to remove accent characteristics the speaker identification system may be trained upon recordings that all feature thick accents, such that when the voice morphing apparatus is trained using this speaker identification system, the apparatus learns to jump away from the cluster of accent features.

Figure 11B:
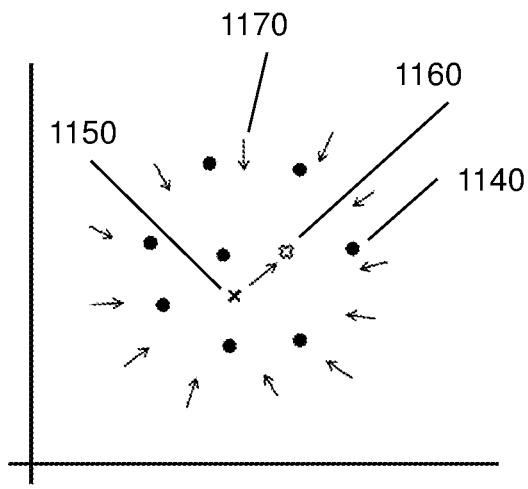

Certain embodiments described herein differ from comparative approaches that attempt to map speaker features present in input audio data to either another target speaker or an average of a set of target speakers. These comparative approaches suffer from issues, such as instead of anonymizing a voice, they instead assign the voice to another speaker. This may lead to its own privacy issues. In certain embodiments described herein, however, the voice morphing apparatus is trained to repel speaker features present in the input audio from known speaker identification speakers, effectively making it difficult to determine an identity as opposed to swapping an identity. This may be shown in the example chart 1130 of FIG. 11B. This example shows a two-dimensional "toy" speaker feature vector. The black circles 1140 represent data points for known speakers (e.g. that represent voices on which the speaker identification system was trained). The black cross 1150 shows an example feature vector for a new input audio sample, e.g. featuring an unknown speaker. By applying the methods of the various aspects and embodiments of the invention, the voice morphing apparatus learns to map the example feature vector to the feature vector shown by a white cross 1160, e.g. into empty feature space in a manner that makes identification difficult (e.g. the white cross 1160 is distant from the black circles 1140 and the black cross 1150). In effect, the white cross 1160 shows a mapped feature vector as seen by the speaker identification system that has a maximal distance from existing speaker feature vectors making the morphed audio data difficult to identify. In comparative systems, the black cross 1150 is typically mapped onto another of the black circles 1140. The arrows 1170 in FIG. 11B also show the action of the audio fidelity term. This acts to constrain the voice morphing apparatus to avoid it morphing the input audio data to result in speaker feature vectors that are simply outside of a training set (e.g. at extreme points as would be found with random noise or distorted speech). The audio fidelity term in effect repels from the extremes within the speaker vector space. Of course, in real examples, the vector space may have hundreds of dimensions as opposed to the one or two shown in the simple examples of FIGS. 11A and 11B.

In certain embodiments, to optimize the parameters of the voice morphing apparatus such that they de-identify a voice in a manner suitable for human listeners, it may be preferred that the speaker identification system is optimized such that a profile of their relative accuracy across training voices is as close as possible to a profile of human listeners' relative accuracy across the same voices. Hence, when trying to minimize a speaker identification certainty, the voice morphing apparatus will learn to modify the voice in the input audio data in a manner that minimizes the change in audio features but that maximizes confusion for human beings. It is preferred to have a large diverse set of voice characteristics such that the voice morphing apparatus may make minimal changes to the input audio data. For example, if the speaker identification is trained using a plurality of people with a thick accent, it may learn to adjust the voice within the feature space of the thick accent but in a manner that results in a voice with a thick accent that is not identifiable.

In certain cases, it may be possible to train the voice morphing apparatus using audio data from a single speaker. In this case, a speaker identification system may be trained on many speakers (which may include the speaker). However, improved morphing characteristics may be present when the voice morphing apparatus is trained using audio data from multiple speakers that are distributed evenly in voice feature space. Multiple speakers may work to reduce noise and randomness (e.g. jumps in the gradient) when training and improve convergence. In one case, mini-batches may be used to average out differences across multiple speakers and/or normalization may be applied. One form of normalization may use speaker embeddings. For example, a training set may indicate a speaker identification (e.g. an ID number) that may be used to retrieve an embedding (i.e. a vector of values) that represents the speaker. The speaker embeddings may be trained with the whole system (and/or components of the system). If speaker embeddings are provided as an input during training, the voice morphing apparatus may be able to use this information to learn to normalize voices without averaging out specific information about different regions of voice feature space.

Methods

Figure 12:
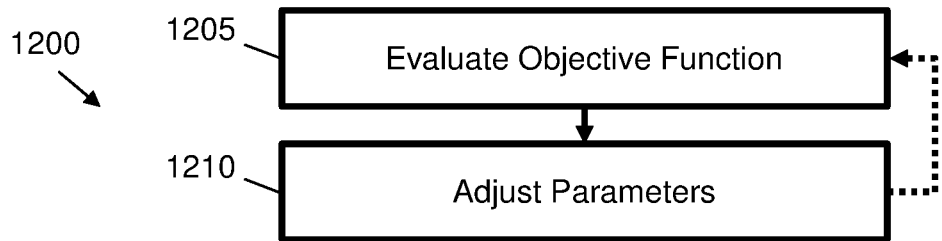
FIG. 12 is a flow diagram showing a method of training a voice morphing apparatus according to an embodiment and an aspect of the invention.

FIG. 12 shows, in accordance with some aspects of the invention, a process or method 1200 of training a voice morphing apparatus according to an embodiment. The voice morphing apparatus may comprise a voice morphing apparatus as described with reference to any of the previous embodiments. The method of training may comprise applying the training system 140 of FIG. 1 or any of the components described with reference to the other embodiments.

At block 1205, the method 1200 comprises evaluating an objective function for a plurality of data samples. Each data sample may be used to generate an input-output pair, e.g. based on input audio data training samples, where the output audio data is generated using the voice morphing apparatus. The objective function is defined as a function of at least an output of the voice morphing apparatus, where this output is generated based on a corresponding input, e.g. as received as a training sample. The objective function may comprise a loss function applied to each training sample, where the loss function is to be minimized. In other embodiments, the objective function may comprise a function to be optimized, e.g. by locating an extremum such as a minimum or maximum.

The objective function comprises a first term based on speaker identification and a second term based on audio fidelity. For example, the first term may be based on a measure of speaker identification determined using at least the output of the voice morphing apparatus. For example, this measure of speaker identification may comprise the output of the one of the speaker identification systems 210, 310 or 710. It may be computed using an output of a speaker identification component and may comprise a certainty or confidence score. The first term modifies the objective function in proportion to the measure of speaker identification, e.g. may increase a value of a loss function to be minimized as a certainty or confidence of identification increases or may decrease a value of an objective function to be maximized. If the measure of speaker identification comprises an identification distance, e.g. a measure of a difference between a speaker probability vector determined based on the input audio data and a speaker probability vector determined based on the output audio data, then the first term may decrease a value of a loss function in proportion to this distance (such that the loss function is minimized as the distance is maximized).

The second term modifies the objective function proportional to a measure of audio fidelity between the output and the input. In certain cases, this may be based on both the input and the output; in other cases, it may be based on the output alone. The measure of audio fidelity may be a measure output by one or more of the components 220, 410, 510, 720 and 810 to 830. If the measure of audio fidelity comprises a distance measure, then an objective function to be minimized may be modified proportional to this measure (such that the objective function is minimized as the distance is minimized); if the measure of audio fidelity comprise a linguistic feature recognition score or probability, then an objective function to be minimized may be modified proportional to an inverse or negatively weighted version of this measure (such that the loss function is minimized as the linguistic feature recognition score is maximized). The term "proportional" is used in the embodiments herein in a broad sense to mean "based on", "in accordance with" or "as a function of". In the objective function itself, terms may be based on positive and/or negative weights, and/or may be modified using inverse computations depending on the measures that are used. The term "measure" is also used broadly herein to cover one or more of continuous values, discrete values, scalars, vectors (and other multidimensional measures), categorical values, and binary values (amongst others).

At block 1210, the evaluating at block 1205 is used to adjust parameters of the voice morphing apparatus. For example, if the voice morphing apparatus comprises an artificial neural network architecture, then adjusting parameters of the voice morphing apparatus comprises applying a gradient descent method to a derivative of the objective function with respect to the parameters of the artificial neural network architecture. The dashed line in FIG. 12 indicates that blocks 1205 and 1210 may be iterated over a plurality of training samples to train the voice morphing apparatus, e.g. the blocks may be repeated for one or more training epochs comprising one or more batches or mini-batches where the evaluating of the objective function is performed.

Figure 13:
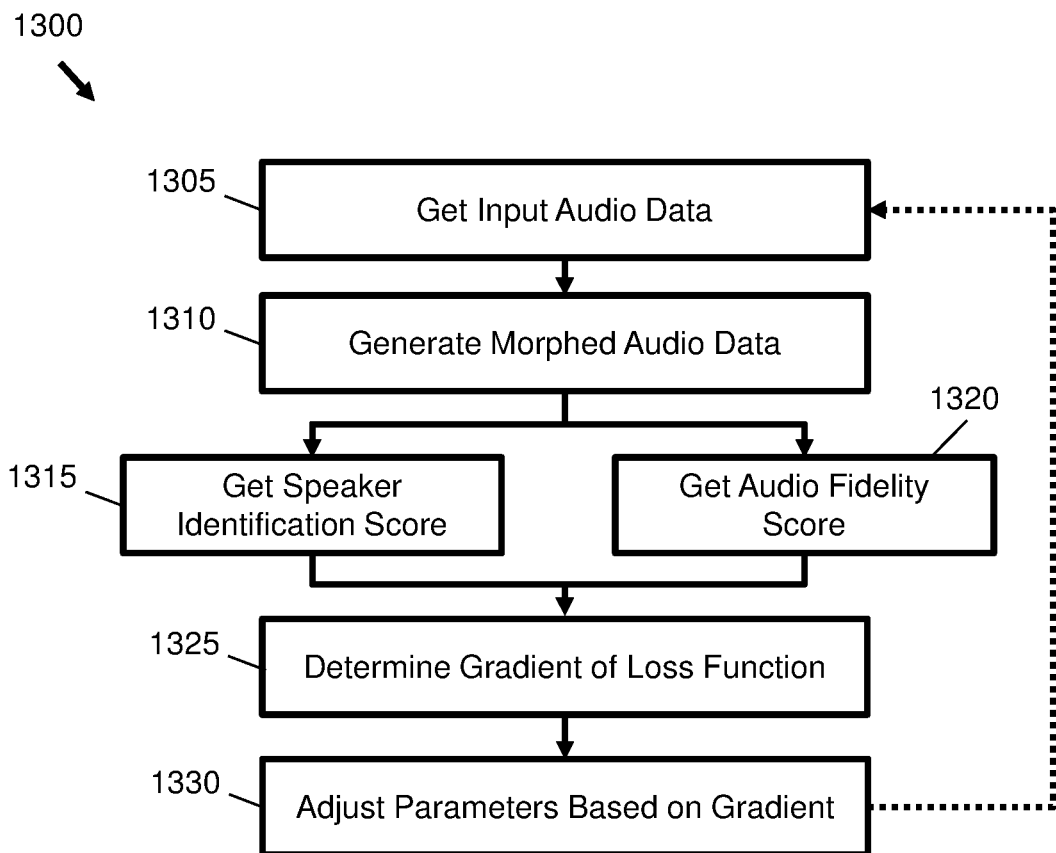
FIG. 13 is a flow diagram showing a method of training a voice morphing apparatus according to another embodiment and an aspect of the invention.

FIG. 13 shows, in accordance with some aspects and other embodiments of the invention, a process or method 1300 of training a voice morphing apparatus. The method of FIG. 13 may be applied when the voice morphing apparatus comprises an artificial neural network architecture, such as a version of the neural vocoders described above. At block 1305 input audio data is obtained. This may comprise loading a sample of audio data from a training set comprising a plurality of input speech segments. At block 1310, the voice morphing apparatus is used to generate morphed audio data. Block 1310 may be performed using a current set of parameters values, e.g. prior to adjustment. At block 1315, the morphed audio data generated at block 1310 is used to obtain a speaker identification score. The speaker identification score may comprise a confidence in correctly identifying a speaker using the morphed audio data. At block 1320, which may be performed in parallel with block 1315, the morphed audio data generated at block 1310 is used to obtain an audio fidelity score. The audio fidelity score may comprise at least a confidence of correctly determining a number of linguistic features from the morphed audio data. Blocks 1315 and 1320 may correspond to determining values for first and second terms of the objective function in block 1305. At block 1325, a gradient of a loss function is determined. The loss function is a function of the speaker identification score and the audio fidelity scores. The loss function may increase in proportion to an increase of the speaker identification score and decrease in proportion to an increase in the audio fidelity score. The gradient may be based on a derivative with respect to trainable parameters of the voice morphing apparatus. At block 1330, the trainable parameters of the voice morphing apparatus are adjusted using the gradient of the loss function. For example, an adjustment to the parameters may be made to follow the gradient towards a minimum to optimize the loss function. Block 1330 may be performed for individual training samples and/or as part of a batch update (e.g. when using stochastic gradient descent to modify the parameters). As per FIG. 12, the method 1300 may be repeated over a plurality of training samples as shown by the dotted line.

In certain embodiments, obtaining an audio fidelity score at block 1320, or evaluating the objective function at block 1205, may comprise computing a first phoneme recognition score for the input to the voice morphing apparatus using an audio processing component and computing a second phoneme recognition score for the output from the voice morphing apparatus using the audio processing component. The second term of the objective function, or the audio fidelity score, may be evaluated based on a comparison between the first and second phoneme recognition scores, e.g. representing a phoneme recognition distance. For example, this is also demonstrated in the embodiment of FIGS. 4 and 8.

In certain embodiments, obtaining an audio fidelity score at block 1320, or evaluating the objective function at block 1205, may alternatively or additionally comprise comparing a spectrogram for the input to the voice morphing apparatus and a spectrogram for the output of the voice morphing apparatus. In this case, the second term of the objective function, or the audio fidelity score, may be evaluated based on the comparison. For example, this is also demonstrated in the embodiment of FIGS. 5 and 8.

In certain embodiments, obtaining a speaker identification score at block 1315, or evaluating the objective function at block 1205, may comprise computing a first speaker identification vector for the input to the voice morphing apparatus using a speaker identification component and computing a second speaker identification vector for the output from the voice morphing apparatus using the speaker identification component. The first term of the objective function, or the speaker identification score, may be evaluated based on a distance between the first and second speaker identification vectors, e.g. representing a speaker identification distance. For example, this is also demonstrated in the embodiment of FIG. 3.

In certain embodiments, the objective function evaluated at block 1205 of the method 1200 comprises one or more further terms based on one or more of a gender classification using at least the output of the voice morphing apparatus and an accent classification using at least the output of the voice morphing apparatus, wherein the one or more further terms are weighted to either maintain or move away from one or more of a gender classification and an accent classification. For example, this may comprise modifying the method 1300 of FIG. 13 to also use the classifiers shown in FIG. 9. In this case, the one or more further terms may be based on the output audio data alone or a comparative score between a classification applied to the input of the voice morphing apparatus and a classification applied to the output of the voice morphing apparatus.

In these methods, an objective function, such as a loss function, may combine a speaker identification certainty measure with an inverse of an audio fidelity distance. The combination of two or more terms may be a weighted sum of each term. In certain cases, the weights may also be learned during training as a trainable parameter of the voice morphing apparatus. In certain cases, the weights may be dynamic, and may change based on values of one or more of the terms. For example, in one case the weights within the loss function may be applied as a form of attention layer during training. The speaker identification score or measure may be a vector. In certain cases, each element of this vector may relate to a different speaker identification feature and/or a different speaker to be identified. The audio fidelity score or measure may also comprise a vector. In certain cases, each element of this vector may relate to a frequency band, Mel feature and/or other audio feature. In these cases, the measures of speaker identification and/or audio fidelity may be distance measures within the multi-dimensional space of the vectors.

It should be noted that in embodiments described herein, the speaker identification measure or data and the audio fidelity measure or data may comprise one or more of continuous and discrete representations. For example, using a logit or probability output from a speaker identification system or an audio fidelity component may provide for a relatively continuous representation (within the limits of the precision of the number representation), which may result in a smooth and continuous loss function that may facilitate training. In other cases, however, the voice morphing apparatus may be trained as part of a generative adversarial network (GAN) and/or using a game-theory based algorithm. In these latter cases, discrete representations such as categorical data may be used as the measure or data. For example, the measure may be a speaker ID and/or a binary measure indicating successful identification or unsuccessful identification. Using differential approaches, as described herein, may help to filter out inconsistencies (e.g. like a cough in the input audio data) and may help avoid disrupting "jumps" (i.e. discontinuities) in the gradient.

Certain embodiments described herein may enable a neural network based voice morphing apparatus to be trained for a combination of at least three objectives: changing the sound of the voice of any speech; preserving the output audio as closely as possible to the input audio; and preserving the intelligibility of speech. In certain embodiments, the voice morphing apparatus may be trained adversarially with respect to at least a speaker identification system. This may be achieved by using a training loss function for the voice morphing apparatus that penalizes a high certainty or confidence from the speaker identification system.

In certain embodiments, to reduce a risk that the voice morphing apparatus simply learns to output random noise, an objective function may be defined that includes a first term that is dependent on the speaker identification certainty and a second term that is dependent on an audio fidelity. If the objective function comprises a loss function to be minimized, then the loss function may comprise a loss term or element that is positively weighted based on the speaker identification certainty and a loss term or element that is negatively (or inversely) weighted based on a distance score between the input and output audio data. A speaker identification term alone would tend to learn a mapping to random noise, wherein an audio fidelity term alone would tend to learn to copy the input to the output (e.g. as a simple pass through filter). However, a combined loss function, where each loss term is appropriate configured to steer the loss of the training, yields a voice morphing apparatus that anonymizes a user yet maintains features of speech that may be understood by a human or a machine and preserves non-speech audio features such as transient or constant noise. the distance score from an input to output audio signal fidelity distance model.

The systems and methods of training described herein also enable certain non-identifying features of speech audio, such as noise, gender, and accent to be preserved. For example, this may be achieved by adding additional loss function terms based on classifier outputs, e.g. as described with reference to FIG. 9, or by isolating certain noise sources, as described with reference to FIG. 10. In these cases, a female speaker with a Californian accent may be morphed such that the gender and accent are still recognizable but such that other audio features are moved away from the particular characteristics of the input speaker, e.g. to a more neutral or general female Californian speaker that masks the identity of the original speaker.

Computer Readable Medium

Figure 14:
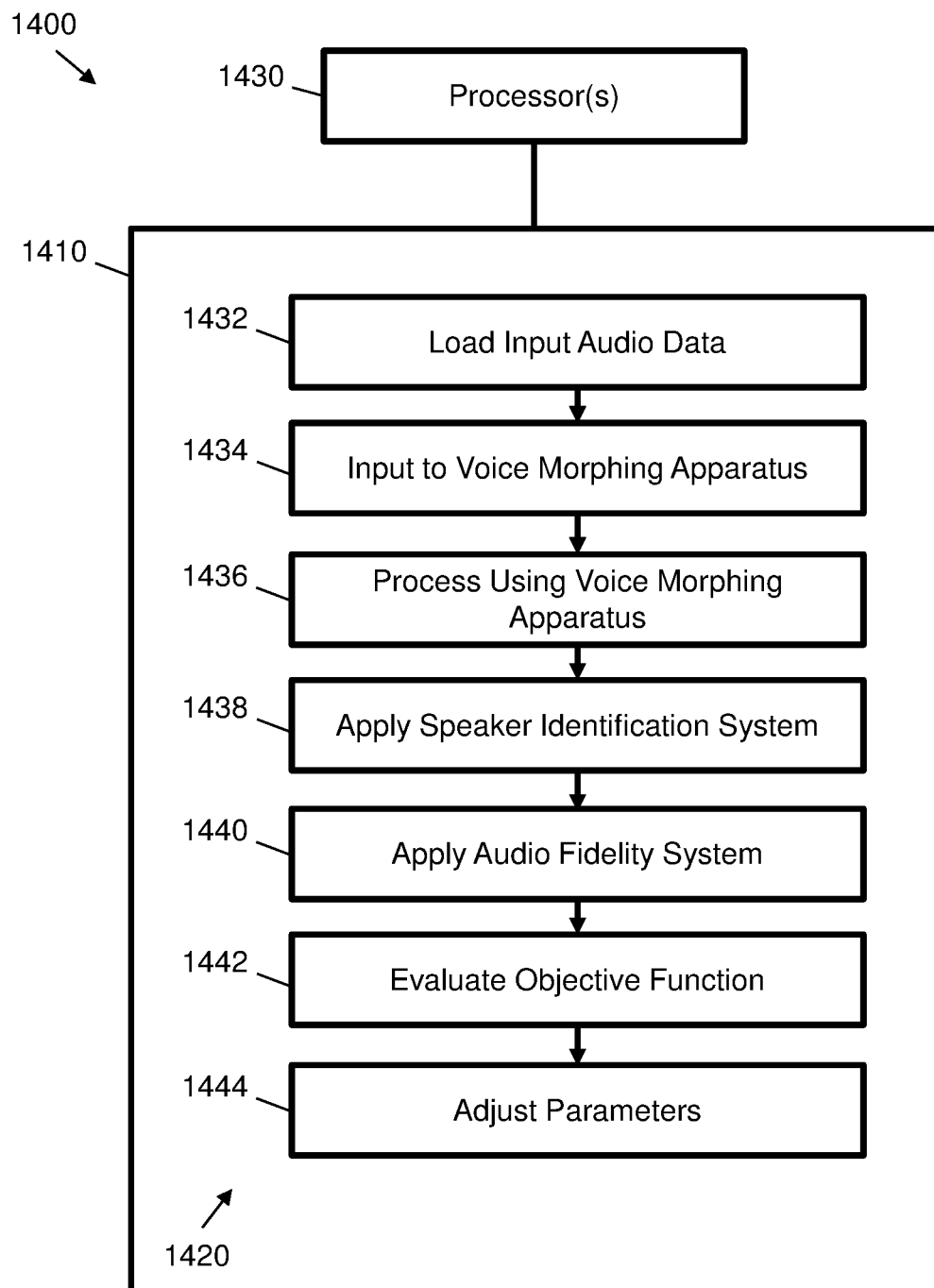
FIG. 14 is a schematic diagram showing a non-transitory computer-readable storage medium according to an embodiment and an aspect of the invention.
Figure 15:
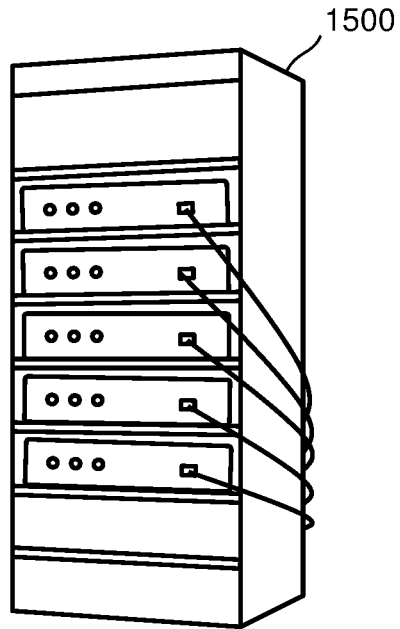
FIG. 15 is a schematic diagram showing an server computing device according to an embodiment and an aspect of the invention.

FIG. 14 shows an embodiment 1400 of a non-transitory computer-readable storage medium 1410 storing instructions 1420 that, when executed by at least one processor 1430, cause the at least one processor to perform a method of training a voice morphing apparatus. This method of training may be similar to the method described with reference to FIGS. 12 and 13 and may be implemented using the systems of any of the other embodiments.

At block 1432, the processor is instructed to load input audio data from a data source. The data source may be internal or external. The input audio data may comprise the input audio data 120 of FIG. 1. At block 1434, the processor is instructed to input the input audio data to a voice morphing apparatus. The voice morphing apparatus may comprise the voice morphing apparatus 110 of the previous embodiments. At block 1436, the processor is instructed to process the input audio data using the voice morphing apparatus to generate morphed audio data. The morphed audio data may comprise the output audio data 130 of FIG. 1. At block 1438, the processor is instructed to apply a speaker identification system to at least the morphed audio data to output a measure of speaker identification. The speaker identification system may comprise a component part of an automatic speech recognition system. The measure of speaker identification may comprise a certainty or confidence score, or a distance measure between identification characteristics of the input and morphed audio data. At block 1440, the processor is instructed to apply an audio fidelity system to the morphed audio data and the input audio data to output a measure of audio fidelity. The audio fidelity system may comprise one or more component parts of an automatic speech recognition system. The measure of audio fidelity may comprise a similarity or distance measure that compares the audio and/or intelligibility characteristics of the input and morphed audio data. At block 1442, the processor is instructed to evaluate an objective function based on the measure of speaker identification and the measure of audio fidelity. This may comprise evaluating a derivative of the objective function and using gradient descent to optimize the objective function. At block 1444, the processor is instructed to adjust a set of trainable parameters for the voice morphing apparatus based on a gradient of the objective function. For example, the trainable parameters may be adjusted by a small amount in a direction that seeks to maximize or minimize the objective function. In general, the objective function is configured to adjust the set of trainable parameters to optimize the measure of audio fidelity between the morphed audio data and the input audio data and to modify the measure of speaker identification, e.g. to reduce a confidence or certainty of successful speaker identification.

Server Implementations

FIG. 1500 shows a rack-mounted server blade multi-processor server system 1500 that may be used to implement the systems and/or perform the methods of the described embodiments. It comprises a multiplicity of network-connected computer processors that run software in parallel.

Figure 16:
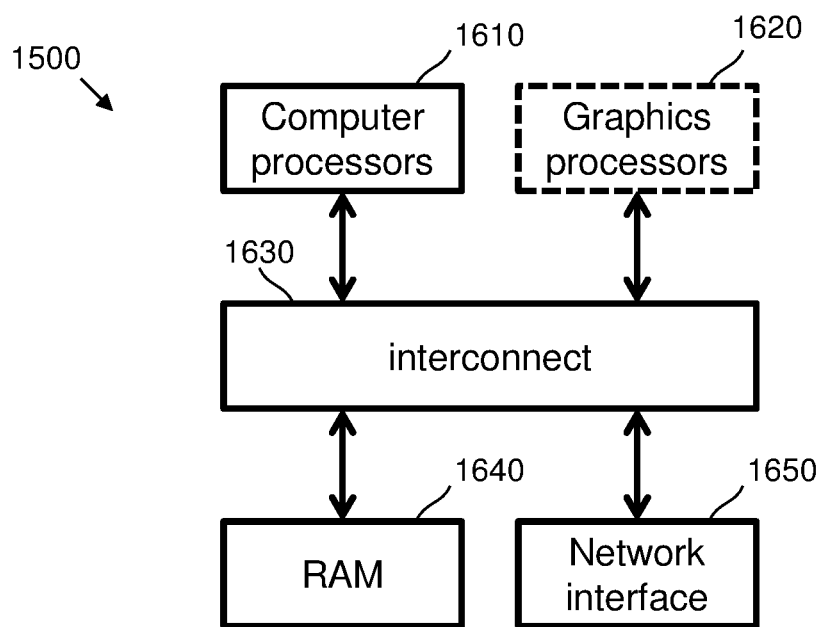
FIG. 16 is a schematic diagram showing components of the server computing device of FIG. 15.

FIG. 16 shows a block diagram of the server system 1500. It comprises a multicore cluster of computer processor (CPU) cores 1610 and optionally a multicore cluster of graphics processor (GPU) cores 1620. The processors connect through a board-level interconnect 1630 to random-access memory (RAM) devices 1640 for program code and data storage. Server system 1500 also comprises a network interface 1650 to allow the processors to access a network such as a local area network (LAN) or the Internet. By executing instructions stored in RAM devices 1640 through interface 1630, the CPUs 1610 and/or GPUs 1620 perform steps of methods as described herein.

Implementations

Certain embodiments described herein may be applied to speech processing including automatic speech recognition. The voice morphing apparatus, once trained, may be used as part of a speech processing pipeline, e.g. a selectively applicable anonymizer that may offer users a "private" speech mode. The voice morphing apparatus may be used to enhance privacy and anonymize the labelling of training data by removing recognizable components.

Certain methods and sets of operations as described herein may be performed by instructions that are stored upon a non-transitory computer readable medium. The non-transitory computer readable medium stores code comprising instructions that, if executed by one or more computers, would cause the computer to perform steps of methods described herein. The non-transitory computer readable medium may comprise one or more of a rotating magnetic disk, a rotating optical disk, a flash random access memory (RAM) chip, and other mechanically moving or solid-state storage media.

Certain embodiments have been described herein, and it will be noted that different combinations of different components from different embodiments may be possible. Salient features are presented to better explain embodiments; however, it is clear that certain features may be added, modified and/or omitted without modifying the functional aspects of these embodiments as described.

Various embodiments are methods that use the behavior of either or a combination of humans and machines. Method embodiments are complete wherever in the world most constituent steps occur. Some embodiments are one or more non-transitory computer readable media arranged to store such instructions for methods described herein. Whatever machine holds non-transitory computer readable media comprising any of the necessary code may implement an embodiment. Some embodiments may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link. For example, a communication link may be established using a wired connection, wireless protocols, near-field protocols, or RFID.

The scope of the invention, therefore, is not intended to be limited to the embodiments shown and described herein. Rather, the scope and spirit of present invention is embodied by the appended claims.

The invention claimed is:

1. A method of training a voice morphing apparatus, the method comprising:
 evaluating an objective function for a plurality of data samples, each data sample including an input for the voice morphing apparatus, the objective function being defined as a function of at least an output of the voice morphing apparatus, the objective function including:
  a first term based on speaker identification, the first term modifying the objective function proportional to a measure of the speaker identification based on at least the output of the voice morphing apparatus; and
  a second term based on audio fidelity of at least the output of the voice morphing apparatus, the second term modifying the objective function proportional to a measure of audio fidelity between the output of the voice morphing apparatus and the input of the voice morphing apparatus; and
 adjusting parameters of the voice morphing apparatus based on the evaluating.

2. The method of claim 1, wherein the voice morphing apparatus comprises an artificial neural network architecture.

3. The method of claim 2, wherein adjusting parameters of the voice morphing apparatus comprises applying a gradient descent method to a derivative of the objective function with respect to the parameters of the artificial neural network architecture.

4. The method of claim 1, wherein the second term is computed using an output of an audio processing component of an automatic speech recognition system.

5. The method of claim 4, wherein the audio processing component is used to compute a speaker intelligibility measure for the second term.

6. The method of claim 4 further comprising:
 computing a first phoneme recognition score for the input to the voice morphing apparatus using the audio processing component;
 computing a second phoneme recognition score for the output from the voice morphing apparatus using the audio processing component; and
 computing the second term based on a comparison between the first phoneme recognition scores and the second phoneme recognition scores.

7. The method of claim 1 further comprising:
comparing a spectrogram for the input to the voice morphing apparatus and a spectrogram for the output of the voice morphing apparatus; and
computing the second term for the objective function based on comprising the spectrograms.

8. The method of claim 1, wherein the first term is computed using an output of a speaker identification component.

9. The method of claim 8, wherein the first term is based on a certainty score output by the speaker identification component.

10. The method of claim 8 further comprising:
computing a first speaker identification vector for the input to the voice morphing apparatus using the speaker identification component;
computing a second speaker identification vector for the output from the voice morphing apparatus using the speaker identification component; and
computing the first term for the objective function based on a comparison between the first speaker identification vectors and the second speaker identification vectors.

11. The method of claim 1, wherein the objective function comprises one or more terms based on one or more of:
a gender classification using at least the output of the voice morphing apparatus; and
an accent classification using at least the output of the voice morphing apparatus,
wherein the one or more terms are weighted to either maintain or move away from one or more of a gender classification and an accent classification.

12. The method of claim 11, wherein the one or more terms are based on a comparative score between a classification applied to the input of the voice morphing apparatus and a classification applied to the output of the voice morphing apparatus.

13. The method of claim 1, wherein input data is preselected to provide a defined distribution of voice characteristics.

14. A system for training a voice morphing apparatus, the system comprising:
a voice morphing apparatus including a set of trainable parameters, the voice morphing apparatus being configured to map input audio data to output audio data;
a speaker identification system configured to output speaker identification data based on input audio data; and
an audio fidelity system configured to output audio fidelity data,
wherein at least output audio data for the voice morphing apparatus is passed to the speaker identification system and the audio fidelity system,
wherein the voice morphing apparatus is trained using at least a set of input audio data, and
wherein an output of the speaker identification system and an output of the audio fidelity system are used to adjust the set of trainable parameters.

15. The system of claim 14, wherein the voice morphing apparatus comprises an artificial neural network architecture.

16. The system of claim 14, wherein the speaker identification system is configured to output a score indicative of a confidence of identification for one or more speakers, and wherein the system evaluates an objective function with a first term based on the score indicative of a confidence of identification, the objective function causing the system to adjust the set of trainable parameters to reduce the score.

17. The system of any of claim 14, wherein the speaker identification system comprises a speaker identification component.

18. The system of claim 17, wherein the system trains the voice morphing apparatus to maximize a difference between outputs of the speaker identification component for the input audio data and the output audio data of the voice morphing apparatus.

19. The system of any of claim 14, wherein the audio fidelity system comprises a speaker intelligibility component, the speaker intelligibility component includes a speech processing component.

20. The system of claim 19, wherein the speaker intelligibility component comprises a phoneme recognition component and the audio fidelity system is configured to output a measure of similarity based on a difference between outputs of the phoneme recognition component for the input audio data and the output audio data of the voice morphing apparatus, and wherein the system trains the voice morphing apparatus to minimize said difference.

21. The system of any of claim 14, wherein the audio fidelity system comprises an audio similarity component configured to compare the input audio data and the output audio data of the voice morphing apparatus and the audio fidelity system is configured to output a measure of similarity based on an output of the audio similarity component, and wherein the system trains the voice morphing apparatus to maximize an output of the audio similarity component for the input audio data and the output audio data.

22. The system of claim 21, wherein the audio similarity component is configured to generate a score indicative of a spectrogram similarity.

23. The system of any of claim 14, further comprising one or more voice feature classifiers, wherein the system applies the one or more voice feature classifiers to at least the output audio data for the voice morphing apparatus and the system uses an output of the one or more voice feature classifiers to adjust the set of trainable parameters for the voice morphing apparatus.

24. The system of claim 23, wherein the system compares outputs of the one or more voice feature classifiers for the input audio data of the voice morphing apparatus and the output audio data of the voice morphing apparatus and to use an output of the comparison to adjust the set of trainable parameters for the voice morphing apparatus.

* * * * *